United States Patent
Kawakami et al.

(10) Patent No.: US 11,159,242 B2
(45) Date of Patent: Oct. 26, 2021

(54) OPTICAL TRANSMITTER

(71) Applicant: NIPPON TELEGRAPH AND TELEPHONE CORPORATION, Tokyo (JP)

(72) Inventors: Hiroto Kawakami, Yokosuka (JP); Akira Hirano, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 588 days.

(21) Appl. No.: 16/078,105

(22) PCT Filed: Feb. 20, 2017

(86) PCT No.: PCT/JP2017/006114
§ 371 (c)(1),
(2) Date: Aug. 21, 2018

(87) PCT Pub. No.: WO2017/145981
PCT Pub. Date: Aug. 31, 2017

(65) Prior Publication Data
US 2021/0194594 A1 Jun. 24, 2021

(30) Foreign Application Priority Data

Feb. 23, 2016 (JP) .................................. 2016-032436
Jun. 20, 2016 (JP) .............................. JP2016-122138

(51) Int. Cl.
*H04B 10/548* (2013.01)
*H04B 10/50* (2013.01)
(52) U.S. Cl.
CPC ....... *H04B 10/548* (2013.01); *H04B 10/5053* (2013.01)
(58) Field of Classification Search
CPC .......................... H04B 10/548; H04B 10/5053
(Continued)

(56) References Cited

U.S. PATENT DOCUMENTS 7,734,194 B2 * 6/2010 Yonenaga .............. H04B 10/58
398/208
9,686,017 B2 * 6/2017 Yamanaka ....... H04B 10/50575
(Continued)

FOREIGN PATENT DOCUMENTS

JP 2011-069924 A 4/2011
JP 2012-247712 A 12/2012
(Continued)

OTHER PUBLICATIONS

Yoshida et al; A study on Automatic Bias Control for Arbitrary Optical signal generation by Dual-parallel Mach-Zehnder Modulator; Sep. 2010;ECOC; pp. 1-3. (Year: 2010).*
(Continued)

*Primary Examiner* — Amritbir K Sandhu
(74) *Attorney, Agent, or Firm* — Harness, Dickey & Pierce, P.L.C.

(57) ABSTRACT

An automatic bias control circuit for an optical modulator using nested MZIs includes: a parent MZI control bias voltage generator that generates a parent MZI control bias voltage; a photodetector that converts tapped output light from the optical modulator into an electrical signal; a low-frequency cut-off circuit that suppresses modulation components that are slower than a first frequency, included in the electrical signal; and a control unit that controls the parent MZI control bias voltage generator on the basis of an electrical signal in which the slower modulation components have been suppressed. The control unit controls the parent MZI control bias voltage generator so as to minimize the effective value or the peak value of the electrical signal in which the slower modulation components have been suppressed.

18 Claims, 18 Drawing Sheets

(58) Field of Classification Search
USPC .................. 398/182, 183, 188, 195, 198
See application file for complete search history.

(56) References Cited

U.S. PATENT DOCUMENTS

| | | | | |
|---|---|---|---|---|
| 9,853,734 | B1* | 12/2017 | Fan | H04B 10/6165 |
| 2010/0021182 | A1* | 1/2010 | Asano | H04B 10/5561 |
| | | | | 398/188 |
| 2012/0308240 | A1* | 12/2012 | Akiyama | H04B 10/5053 |
| | | | | 398/141 |
| 2013/0156444 | A1* | 6/2013 | Akashi | G02F 1/0123 |
| | | | | 398/186 |
| 2014/0029956 | A1* | 1/2014 | Le Taillandier De Gabory | H04B 10/541 |
| | | | | 398/186 |
| 2014/0294401 | A1* | 10/2014 | Chung | H04B 10/5053 |
| | | | | 398/188 |
| 2014/0334829 | A1* | 11/2014 | Akiyama | G02F 1/0123 |
| | | | | 398/186 |
| 2018/0074348 | A1* | 3/2018 | Fujita | G02F 1/225 |
| 2018/0323878 | A1* | 11/2018 | Kawakami | G02F 1/225 |
| 2019/0036611 | A1* | 1/2019 | Fujita | G02F 1/0123 |

FOREIGN PATENT DOCUMENTS

| | | | |
|---|---|---|---|
| JP | 2015-530612 A | 10/2015 | |
| JP | 2016111398 A | 6/2016 | |
| WO | WO-2014/025683 A2 | 2/2014 | |
| WO | WO-2014025683 A2 * | 2/2014 | ......... H04B 10/5561 |

OTHER PUBLICATIONS

H. Kawakami et al., "Auto bias control and bias hold circuit for IQ-modulator in flexible optical QAM transmitter with Nyquist filtering", Optics Express, vol. 22, No. 23, pp. 28163-28168, 2014.

Pak S. Cho et al., "Bias Control for Optical OFDM Transmitters", IEEE Photonics Technology Letters, vol. 22, No. 14, pp. 1030-1032, 2010.

International Search Report for PCT/JP2017/006114, ISA/JP, dated May 9, 2017, with English translation attached.

Japanese Notice of Allowance regarding JPSN 2018501666, dated Jun. 18, 2019.

* cited by examiner (a) θ (AVERAGE) = 0.7 × π/2

(b) θ (AVERAGE) = 1.3 × π/2

16QAM

OPTICAL PHASE DIFFERENCE $\theta$ (deg)

(a)

(b)

OPTICAL TRANSMITTER

CROSS-REFERENCE TO RELATED APPLICATIONS

This application is a 371 U.S. National Stage of International Application No. PCT/JP2017/006114, filed Feb. 20, 2017. Priority is claimed on Japanese Patent Application No. 2016-032436, filed Feb. 23, 2016, and on Japanese Patent Application No. 2016-122138, filed Jun. 20, 2016. The contents of all of the above applications are incorporated herein by reference.

TECHNICAL FIELD

The present invention relates to an optical transmitter.

BACKGROUND ART

As means for generating optical signals used in optical transmitters, optical modulators having the function of modulating the intensity or optical phase of continuous-wave light (CW light) have been widely used. While there are several types of optical modulators, an optical modulator with a basic structure has an optical input terminal to which CW light from a CW light source is input, an optical output terminal from which a modulated signal is output, and drive signal input electrodes for inputting electrical data signals. In an optical modulator in the ideal state, optical intensity-modulated signals or optical phase-modulated signals bearing information corresponding to radio frequency (RF) drive signals applied to the drive signal input electrodes are output from the optical output terminal.

The present application mainly relates to an optical transmitter for generating optical quadrature amplitude modulation (QAM) signals. Therefore, unless specifically indicated, hereinbelow, an optical modulator refers to an optical modulator for generating QAM signals. It is to be noted that optical QAM is a modulation scheme in which CW light having a single wavelength is split in two, the split CW light components are independently intensity-modulated or phase-modulated to generate in-phase modulated light and quadrature-phase modulated light, and these are combined to transmit data.

In order to generate optical QAM signals, optical modulators that combine multiple Mach-Zehnder interferometers (MZIs) in nested form are widely used. FIG. 15 shows a typical example of an optical modulator forming a conventional QAM signal-generating optical transmitter and peripheral circuits thereof.

The optical modulator M is a semiconductor optical modulator using nested MZIs. Inside the optical modulator M, CW light is split by an optical splitting unit 200, and the split CW light components are input to an MZI 2a for the in-phase component and an MZI 2b for the quadrature component. Hereinbelow, the MZI 2a for the in-phase component will also be referred to as the in-phase MZI 2a, and the MZI 2b for the quadrature component will also be referred to as the quadrature MZI 2b. The outputs of the in-phase MZI 2a and the quadrature MZI 2b are multiplexed by an optical multiplexing unit 201, and the multiplexed optical signal is output from the optical modulator M. The in-phase MZI 2a, the quadrature MZI 2b, the optical splitting unit 200, and the optical multiplexing unit 201 form a single MZI, and this interferometer will be referred to as a parent MZI 20.

Drive signals $\pm V_{data\_a}$ are generated by an in-phase drive amplifier 3a and are applied to the in-phase MZI 2a via a first in-phase drive signal input electrode 6a and a second in-phase drive signal input electrode 6b. Similarly, drive signals $\pm V_{data\_b}$ are generated by a quadrature drive amplifier 3b and are applied to the quadrature MZI 2b via a first quadrature drive signal input electrode 6c and a second quadrature drive signal input electrode 6d. If $\pm V_{data\_a}$ and $\pm V_{data\_b}$ are n-ary RF intensity-modulated signals, then the modulated light output from the optical modulator M will be an $n^2$-ary QAM signal. However, in order to perform modulation correctly, the optical path lengths must be precisely adjusted so that the two light components that interfere in the MZIs have the correct optical phase differences. Three bias voltages are usually used for this adjustment, and these will be referred to hereinbelow as the in-phase MZI control bias voltage, the quadrature MZI control bias voltage, and the parent MZI control bias voltage. By applying these three bias voltages, for example, to a heater so as to thermally expand the optical waveguides, it is possible to finely tune the optical phase differences.

The optical phase differences in the in-phase MZI 2a and the quadrature MZI 2b are adjusted so as to bias the MZIs at the null points. In other words, the optical phase differences are adjusted so that the optical outputs of the in-phase MZI 2a and the quadrature MZI 2b are extinguished at the moment $V_{data\_a}=V_{data\_b}=0$. In FIG. 15, the output voltage of an in-phase MZI control bias voltage generator 7a adjusts the optical phase difference in the in-phase MZI 2a via a first in-phase MZI control bias electrode 8a and a second in-phase MZI control bias electrode 8b so as to bias the in-phase MZI 2a at the null point. Additionally, the output voltage of a quadrature MZI control bias voltage generator 7b adjusts the optical phase difference in the quadrature MZI 2b via a first quadrature MZI control bias electrode 8c and a second quadrature MZI control bias electrode 8d so as to bias the quadrature MZI 2b at the null point.

The optical phase difference in the parent MZI 20 is adjusted so that the optical phase differences θ that are added to the optical outputs of the in-phase MZI 2a and the quadrature MZI 2b are $+\pi/2$ or $-\pi/2$. The parent MZI control bias voltage output from a parent MZI control bias voltage generator 108 adjusts the optical phase difference in the parent MZI 20 via a parent MZI control bias electrode 101. Hereinbelow, the optical phase difference between the optical output of the in-phase MZI 2a and the optical output of the quadrature MZI 2b will also simply be described as "θ".

In an actual optical modulator, the optimum values of the in-phase MZI control bias voltage, the quadrature MZI control bias voltage, and the parent MZI control bias voltage are not uniquely determined, and they will vary over time due to temperature fluctuations and other reasons. This phenomenon is known as bias drift. If bias drift is allowed to occur, the optical signals will degrade to the point where they are impossible to be demodulated, and thus it is essential to implement in-service auto bias control (ABC). Additionally, the optimum bias value also depends, to some degree, on the wavelength of the CW light. Therefore, when the wavelength channel is changed, it is necessary to quickly select a new optimum bias voltage by ABC.

As means for implementing ABC of the above-mentioned three bias voltages, there is a method in which asymmetric bias dithering is used. Asymmetric bias dithering has the significant advantages that all three bias voltages can be optimally controlled by dithering only the in-phase MZI control bias voltage and the quadrature MZI control bias voltage, and that they can be locked after selecting the sign of the above-mentioned optical phase difference $\theta=\pm\pi/2$, thereby allowing for precise pre-equalization and fine correction of chirping that is generated in the modulator (see, e.g., Non-Patent Document 1).

However, ABC using asymmetric bias dithering has the problem wherein the error detection sensitivity of the parent MZI control bias is lower than the error detection sensitivity of the other two biases, and a high-sensitivity detection circuit is necessary for detecting drift.

Additionally, in addition to asymmetric bias dithering, multiple methods have been proposed for implementing ABC of a parent MZI control bias (see, e.g., Non-Patent Document 2).

PRIOR ART DOCUMENTS

Non-Patent Documents

Non-Patent Document 1: H. Kawakami, et al., "Auto bias control and bias hold circuit for IQ-modulator in flexible optical QAM transmitter with Nyquist filtering", Optics Express, Vol. 22, No. 23, pp. 28163-28168, 2014

Non-Patent Document 2: Pak S. Cho, et al., "Bias Control for Optical OFDM Transmitters", IEEE Photonics Technology Letters, Vol. 22, No. 14, pp. 1030-1032, 2010

SUMMARY OF INVENTION

Problems to be Solved by Invention

In general, ABC for a parent MZI control bias as described in Non-Patent Document 2 involves very significant difficulties in comparison to ABC for the other two types of bias. The reasons therefor are explained below.

FIG. 16 shows the results obtained by simulations when a QAM signal from a conventional QAM signal-generating optical transmitter is received by a photodetector (PD) and the obtained optical signal is converted into an electrical signal. For the sake of simplicity, it is assumed that the QAM is quaternary, i.e., quadrature phase shift keying (QPSK). Additionally, it is assumed that the optical modulator operates ideally and that the PD has a band that is about the same as the QAM symbol rate. In FIG. 16, the situation in which the in-phase MZI control bias voltage and the quadrature MZI control bias voltage are adjusted to optimum values and only the parent MZI control bias drifts is considered. While the electrical signal may be either positive or negative, the intensity of the optical signal is always a positive value, so the PD output will always have a single sign (positive in the drawing).

The case in which $\theta$ is the optimum value $\pi/2$ is shown in FIG. 16(b). The constellation has a square profile, and the envelope at the upper end of the PD output voltage forms a straight line. There are deep notches and shallow notches, and each of these notches occurs as a result of a transition to an adjacent symbol or a transition to a diagonally located symbol. When statistically processed over a time much longer than the symbol period, the average value of the voltage was 1.57, and the root mean square (RMS; effective value) was 1.65.

Next, cases in which the parent MZI control bias drifts and $\theta$ becomes a value other than the optimum value $\pi/2$ are shown in FIG. 16(a) and FIG. 16(c). The constellations have a diamond-shaped profile, and the envelopes of the PD output waveforms are split vertically in two. In an ideal modulator, the envelope rises and drops by the same amount, so the time-average of the voltage is held at a constant value of 1.57, regardless of the value of $\theta$. For this reason, $\theta$ cannot be monitored by measuring the average value of the PD output.

In contrast, the variance and the root mean square (RMS) of the PD output voltage become larger as $\theta$ diverges further from the optimum value. It is possible to monitor the drift of the parent MZI control bias by making use of this property (see, e.g., Non-Patent Document 2).

Additionally, the peak value of the PD output voltage also becomes higher as $\theta$ diverges further from the optimum value. As mentioned in the explanation of FIG. 16(b), in the graph of time versus PD output voltage shown in FIG. 16, the notch portions of the waveform are formed by inter-symbol transitions. In contrast, the height of the PD output voltage between notches is determined by the optical intensity of the QPSK symbols. Furthermore, this optical intensity is proportional to the square of the distance from the origin of the constellation, i.e., the square of the magnitude of the optical electric field. In FIG. 16(a), the times at which the PD output voltage reaches the peak value 2.9 are the times at which the symbols at the acute corners (upper right and lower left) of the constellation appear. Likewise, in FIG. 16(c), the times at which the PD output voltage reaches the peak value 2.9 correspond to the acute corners (lower right and upper left) of the constellation. The peak values of the PD output voltage are the smallest when $\theta=\pi/2$, as shown in FIG. 16(b), and in that case, $\theta$ has the optimum value.

However, the problem with these techniques is that the variance, RMS, or peak value of the PD output voltage increases whether $\theta$ becomes larger than or smaller than the optimum value. For this reason, the drift direction cannot be directly determined, and it is difficult to implement ABC of the parent MZI control bias.

It is also theoretically possible to determine the drift direction by applying dithering to the parent MZI control bias. FIG. 17 is a diagram showing the constellation and the PD output voltage waveform for an optical QAM signal when applying dithering to the parent MZI control bias voltage in a conventional QAM signal-generating optical transmitter. FIG. 17(a) shows the simulation results of the constellation and PD output voltage when $\theta$ is slightly increased and decreased by dithering. It is assumed that the in-phase MZI control bias voltage and the quadrature MZI control bias voltage are adjusted to their optimum values in FIG. 17 as well.

FIG. 17(a) illustrates dithering centered at $\theta=0.7\pi/2$, for which the average voltage #1 in time bands in which $\theta$ is slightly increased and the average voltage #2 in time bands in which $\theta$ is slightly decreased are both 1.57. However, the RMS #1 of the voltage in the time bands in which $\theta$ is slightly increased and the RMS #2 of the voltage in the time bands in which $\theta$ is slightly decreased are respectively 1.72 and 1.89, so a difference arises.

FIG. 17(b) illustrates the case in which $\theta$ is centered at $\theta=1.3\pi/2$ and $\theta$ is slightly increased and decreased. The RMS #1 of the voltage in the time bands in which $\theta$ is slightly increased and the RMS #2 of the voltage in the time bands in which $\theta$ is slightly decreased are respectively 1.89 and 1.72, so the magnitudes of the RMS are the opposite of those in FIG. 17(a). This is because the RMS has a minimum value when $\theta$ is $\pm\pi/2$, which are the optimum values. By synchronously detecting variations in the RMS using a reference clock that is synchronized with the dither signal, it is also theoretically possible to determine whether $\theta$ is larger or smaller than the optimum value, and to determine whether the correction amount to be applied to the parent MZI control bias should be positive or negative.

However, when the aforementioned techniques are actually performed, the problems described below occur. In an actual optical modulator, even if the in-phase MZI control bias voltage and the quadrature MZI control bias voltage are optimized, it is still possible for the optical modulator output optical power to be somewhat affected by the parent MZI control bias. These variations in the optical power arise due to the incompleteness of modulators and electric field-dependence of the optical waveguide loss in semiconductor modulators, so they are unrelated to the optimum value of θ and can be an error factor in ABC.

FIG. 18 illustrates simulation results for the case in which, in addition to the conditions of the simulations in FIG. 17, the condition wherein the modulator loss slightly decreases (or increases) when θ slightly increases (or decreases) is applied. FIG. 18(a) illustrates dithering centered at θ=0.7π/2, for which the average voltage #1 in time bands in which θ is slightly increased and the average voltage #2 in time bands in which θ is slightly decreased are respectively 1.82 and 1.34. Averaging over a time period longer than the dithering period yields (1.82+1.34)/2=1.58, which is approximately the same value as in FIG. 17. The RMS #1 of the voltage in the time bands in which θ is slightly increased and the RMS #2 of the voltage in the time bands in which θ is slightly decreased are respectively 1.99 and 1.61.

FIG. 18(b) illustrates dithering centered at θ=1.3π/2, for which the average voltage #1 in the time bands in which θ is slightly increased and the average voltage #2 in the time bands in which θ is slightly decreased are respectively 1.82 and 1.34, as in FIG. 18(a). The RMS #1 of the voltage in the time bands in which θ is slightly increased and the RMS #2 of the voltage in the time bands in which θ is slightly decreased are respectively 2.18 and 1.47. In FIG. 18, RMS #1>RMS #2 in both FIG. 18(a) and FIG. 18(b), and the magnitudes thereof do not become inverted. For this reason, the problem of not being able to correctly control the parent MZI control bias arises.

Aside from the above-described problem, when actually performing the technique described in FIG. 17, band limits on the PDs used for ABC also present a problem. In order to simplify the explanation, in FIG. 16 to FIG. 18, the band of the PD is made about the same as the symbol rate. However, high-band PDs are expensive, and the monitoring PDs that are contained in optical modulators generally operate at much lower bands than the symbol rate, so it is more difficult to measure the variance and the RMS of the PD output voltage than to measure the average value of the PD output voltage. In particular, when the drive waveform is complex and analog-like as in the case of a Nyquist-filtered multi-level optical QAM signal, the PD output waveform becomes analog-like even if θ is optimized, and the θ-dependence of the variance and the RMS of the PD output voltage becomes smaller, making it even more difficult to detect drift of the parent MZI control bias.

In view of the above-described circumstances, the present invention has the purpose of providing an optical transmitter wherein, in a QAM signal-generating optical modulator having multiple MZIs, the parent MZI control bias voltage is more precisely and accurately controlled than in conventional optical transmitters.

Means for Solving Problems

One aspect of the present invention is an optical transmitter including: an optical modulator; and an automatic bias control circuit, wherein the optical modulator includes: a parent MZI which is a Mach-Zehnder interferometer including an in-phase MZI which is a Mach-Zehnder interferometer for in-phase component and a quadrature MZI which is a Mach-Zehnder interferometer for quadrature component; an optical input terminal that splits continuous-wave light and inputs the split continuous-wave light to the in-phase MZI and the quadrature MZI; an in-phase drive signal input electrode to which is applied a drive signal for implementing optical modulation by changing an optical phase difference between two branches of light obtained by splitting the continuous-wave light in the in-phase MZI; a quadrature drive signal input electrode to which is applied a drive signal for implementing optical modulation by changing an optical phase difference between two branches of light obtained by splitting the continuous-wave light in the quadrature MZI; an optical output terminal that multiplexes light output from the in-phase MZI and light output from the quadrature MZI and outputs the multiplexed light; and a parent MZI control bias electrode to which is applied a parent MZI control bias voltage for adjusting an optical phase difference between the light output from the in-phase MZI and the light output from the quadrature MZI, the in-phase MZI includes: a first splitting unit that splits the continuous-wave light input from the optical input terminal into the two branches; and a first multiplexing unit that multiplexes the light of the two branches optically modulated by the drive signal applied to the in-phase drive signal input electrode, and outputs the multiplexed light, the quadrature MZI includes: a second splitting unit that splits the continuous-wave light input from the optical input terminal into the two branches; and a second multiplexing unit that multiplexes the light of the two branches optically modulated by the drive signal applied to the quadrature drive signal input electrode, and outputs the multiplexed light, the automatic bias control circuit includes: a parent MZI control bias voltage generator that generates the parent MZI control bias voltage applied to the parent MZI control bias electrode; a photodetector that converts tapped output light from the optical modulator into an electrical signal; a low-frequency cut-off circuit that suppresses modulation components that are slower than a first frequency, included in the electrical signal converted by the photodetector; and a control unit that controls the parent MZI control bias voltage generator on the basis of an electrical signal in which the slower modulation components have been suppressed by the low-frequency cut-off circuit, and the control unit controls the parent MZI control bias voltage generator so as to minimize an effective value or a peak value of the voltage of the electrical signal in which the slower modulation components have been suppressed.

One aspect of the present invention is an optical transmitter including: an optical modulator; and an automatic bias control circuit, wherein the optical modulator includes: a parent MZI which is a Mach-Zehnder interferometer including an in-phase MZI which is a Mach-Zehnder interferometer for in-phase component and a quadrature MZI which is a Mach-Zehnder interferometer for quadrature component; an optical input terminal that splits continuous-wave light and inputs the split continuous-wave light to the in-phase MZI and the quadrature MZI; an in-phase drive signal input electrode to which is applied a drive signal for implementing optical modulation by changing an optical phase difference between two branches of light obtained by splitting the continuous-wave light in the in-phase MZI; a quadrature drive signal input electrode to which is applied a drive signal for implementing optical modulation by changing an optical phase difference between two branches of light obtained by splitting the continuous-wave light in the quadrature MZI; an optical output terminal that multiplexes light output from the in-phase MZI and light output from the quadrature MZI and outputs the multiplexed light; and a parent MZI control bias electrode to which is applied a parent MZI control bias voltage for adjusting an optical phase difference between the light output from the in-phase MZI and the light output from the quadrature MZI, the in-phase MZI includes: a first splitting unit that splits the continuous-wave light input from the optical input terminal into the two branches; and a first multiplexing unit that multiplexes the light of the two branches optically modulated by the drive signal applied to the in-phase drive signal input electrode, and outputs the multiplexed light, the quadrature MZI includes: a second splitting unit that splits the continuous-wave light input from the optical input terminal into the two branches; and a second multiplexing unit that multiplexes the light of the two branches optically modulated by the drive signal applied to the quadrature drive signal input electrode, and outputs the multiplexed light, the automatic bias control circuit includes: a parent MZI control bias voltage generator that generates the parent MZI control bias voltage applied to the parent MZI control bias electrode; a photodetector that converts tapped output light from the optical modulator into an electrical signal; a clipper circuit that clips the electrical signal at a predetermined threshold value; and a control unit that feedback-controls the parent MZI control bias voltage generator on the basis of an electrical signal clipped by the clipper circuit, and the control unit controls the parent MZI control bias voltage generator so as to minimize an average value, an effective value, or a peak value of the voltage of the clipped electrical signal.

According to one aspect of the present invention, in the optical transmitter as mentioned above, the automatic bias control circuit further includes a low-frequency cut-off circuit that suppresses modulation components that are slower than a first frequency, included in the electrical signal converted by the photodetector, and outputs, to the clipper circuit, an electrical signal in which the slower modulation components have been suppressed.

According to one aspect of the present invention, in the optical transmitter as mentioned above, the low-frequency cut-off circuit is formed from an amplifier including a gain adjustment circuit of which a response speed is equal to or less than the first frequency.

According to one aspect of the present invention, in the optical transmitter as mentioned above, the low-frequency cut-off circuit cuts off at least some of random noise generated in peripheral circuits in the optical transmitter or random noise in the continuous-wave light input to the optical input terminal.

According to one aspect of the present invention, in the optical transmitter as mentioned above, the automatic control circuit includes: a first dithering application unit that applies dithering, at a second frequency lower than the first frequency, to the parent MZI control bias voltage; and a synchronous detection unit that performs, at the second frequency, synchronous detection on the electrical signal in which the slower modulation components have been suppressed by the low-frequency cut-off circuit, and the control unit implements processing for controlling the parent MZI control bias voltage generator so that a result of the synchronous detection is 0.

According to one aspect of the present invention, in the optical transmitter as mentioned above, the control unit controls the parent MZI control bias voltage generator so that a result obtained by adding a predetermined offset value to the result of the synchronous detection is 0, and the offset value is determined by error in an optical power monitor for measuring the intensity of the output light from the optical modulator.

According to one aspect of the present invention, in the optical transmitter as mentioned above, the automatic bias control circuit includes: a second dithering application unit that applies dithering, at a third frequency, to the threshold value of the clipping by the clipper circuit; and a synchronous detection unit that performs, at the third frequency, synchronous detection on an output from the clipper circuit, and the control unit implements processing for controlling the parent MZI control bias voltage generator by referring to the result of the synchronous detection.

According to one aspect of the present invention, in the optical transmitter as mentioned above, the control unit controls the parent MZI control bias voltage generator by referring to a result obtained by adding a predetermined offset value to the result of the synchronous detection, and the offset value is determined by error in an optical power monitor for measuring the intensity of output light from the optical modulator.

According to one aspect of the present invention, the optical modulator further includes: an in-phase MZI control bias electrode to which is applied an in-phase MZI control bias voltage for adjusting the optical phase difference between the light of the two branches optically modulated by the drive signal applied to the in-phase drive signal input electrode; and a quadrature MZI control bias electrode to which is applied a quadrature MZI control bias voltage for adjusting the optical phase difference between the light of the two branches optically modulated by the drive signal applied to the quadrature drive signal input electrode, the first multiplexing unit multiplexes the light from the two branches optically modulated by the drive signal applied to the in-phase drive signal input electrode and of which the optical phase difference has been adjusted by the in-phase MZI control bias voltage applied to the in-phase MZI control bias electrode, and outputs the multiplexed light, the second multiplexing unit multiplexes the light from the two branches optically modulated by the drive signal applied to the quadrature drive signal input electrode and of which the optical phase difference has been adjusted by the quadrature MZI control bias voltage applied to the quadrature MZI control bias electrode, and outputs the multiplexed light, the automatic bias control circuit includes a third dithering application unit that applies dithering, at a fourth frequency, to at least one of the in-phase MZI control bias voltage applied to the in-phase MZI control bias electrode and the quadrature MZI control bias voltage applied to the quadrature MZI control bias electrode, and the fourth frequency or a frequency that is twice the fourth frequency is higher than the first frequency.

According to one aspect of the present invention, in the optical transmitter as mentioned above, the amplitude of the dithering during a startup sequence of the optical transmitter is made larger than the amplitude of the dithering during an operating period.

According to one aspect of the present invention, in the optical transmitter as mentioned above, the clipper circuit implements the clipping by raising a signal that does not reach the threshold value up to the threshold value.

According to one aspect of the present invention, in the optical transmitter as mentioned above, the optical modulator further includes: an in-phase MZI control bias electrode to which is applied an in-phase MZI control bias voltage for adjusting the optical phase difference between the light of the two branches optically modulated by the drive signal applied to the in-phase drive signal input electrode; and a quadrature MZI control bias electrode to which is applied a quadrature MZI control bias voltage for adjusting the optical phase difference between the light of the two branches optically modulated by the drive signal applied to the quadrature drive signal input electrode, the first multiplexing unit multiplexes the light from the two branches optically modulated by the drive signal applied to the in-phase drive signal input electrode and of which the optical phase difference has been adjusted by the in-phase MZI control bias voltage applied to the in-phase MZI control bias electrode, and outputs the multiplexed light, the second multiplexing unit multiplexes the light from the two branches optically modulated by the drive signal applied to the quadrature drive signal input electrode and of which the optical phase difference has been adjusted by the quadrature MZI control bias voltage applied to the quadrature MZI control bias electrode, and outputs the multiplexed light, and the control unit adjusts one or both of the in-phase MZI control bias voltage applied to the in-phase MZI control bias electrode and the quadrature MZI control bias voltage applied to the quadrature MZI control bias electrode before starting to control the parent MZI control bias voltage.

One aspect of the present invention is an optical transmitter including: an optical modulator; and an automatic bias control circuit, wherein the optical modulator includes: a parent MZI which is a Mach-Zehnder interferometer including an in-phase MZI which is a Mach-Zehnder interferometer for in-phase component and a quadrature MZI which is a Mach-Zehnder interferometer for quadrature component; an optical input terminal that splits continuous-wave light and inputs the split continuous-wave light to the in-phase MZI and the quadrature MZI; an in-phase drive signal input electrode to which is applied a drive signal for implementing optical modulation by changing an optical phase difference between two branches of light obtained by splitting the continuous-wave light in the in-phase MZI; a quadrature drive signal input electrode to which is applied a drive signal for implementing optical modulation by changing an optical phase difference between two branches of light obtained by splitting the continuous-wave light in the quadrature MZI; an optical output terminal that multiplexes light output from the in-phase MZI and light output from the quadrature MZI and outputs the multiplexed light; and a parent MZI control bias electrode to which is applied a parent MZI control bias voltage for adjusting an optical phase difference between the light output from the in-phase MZI and the light output from the quadrature MZI, the in-phase MZI includes: a first splitting unit that splits the continuous-wave light input from the optical input terminal into the two branches; and a first multiplexing unit that multiplexes the light of the two branches optically modulated by the drive signal applied to the in-phase drive signal input electrode, and outputs the multiplexed light, the quadrature MZI includes: a second splitting unit that splits the continuous-wave light input from the optical input terminal into the two branches; and a second multiplexing unit that multiplexes the light of the two branches optically modulated by the drive signal applied to the quadrature drive signal input electrode, and outputs the multiplexed light, the automatic bias control circuit includes: a parent MZI control bias voltage generator that generates the parent MZI control bias voltage applied to the parent MZI control bias electrode; a photodetector that generates voltages corresponding to the intensity of tapped output light from the optical modulator; an identification circuit that compares the values of the voltages generated by the photodetector with a predetermined threshold value and chooses the voltages that are greater than the threshold value or the voltages that are less than the threshold value; a computation circuit that performs a computation process using data regarding the voltages chosen by the identification circuit; and a control unit that feedback-controls the parent MZI control bias voltage generator on the basis of a result of the computation process.

According to one aspect of the present invention, in the optical transmitter as mentioned above, the computation circuit computes, during the computation process, a time-average value of the voltages that are chosen, an integrated value of the voltages that are chosen, or a root mean square of the voltages that are chosen.

According to one aspect of the present invention, in the optical transmitter as mentioned above, the computation circuit computes, during the computation process, a frequency by which the voltages are chosen by the identification circuit.

According to one aspect of the present invention, in the optical transmitter as mentioned above, the identification circuit chooses the voltages output from the photodetector on the basis of each of N (where N is a natural number) threshold values, and the computation circuit performs the computation process on data for each of N types of voltage chosen by the identification circuit.

According to one aspect of the present invention, in the optical transmitter as mentioned above, the identification circuit chooses the voltages output from the photodetector so that an upper limit and a lower limit are defined by two threshold values, and the computation circuit performs the computation process on data regarding the voltages chosen by the identification circuit.

According to one aspect of the present invention, in the optical transmitter as mentioned above, the control unit, when the frequency by which the voltages are chosen by the identification circuit is less than a predetermined frequency, shifts the threshold value closer to a time-average value of the voltages generated by the photodetector.

Advantageous Effects of Invention

With the present invention, it is possible to realize, in a QAM signal-generating optical modulator including multiple MZIs, automatic bias-voltage adjustment whereby a parent MZI control bias voltage can be more precisely and more accurately controlled than by the conventional art.

MODES FOR CARRYING OUT THE INVENTION

Hereinbelow, the optical transmitters according to the embodiments of the present invention will be described with reference to the drawings.

Figure 15:
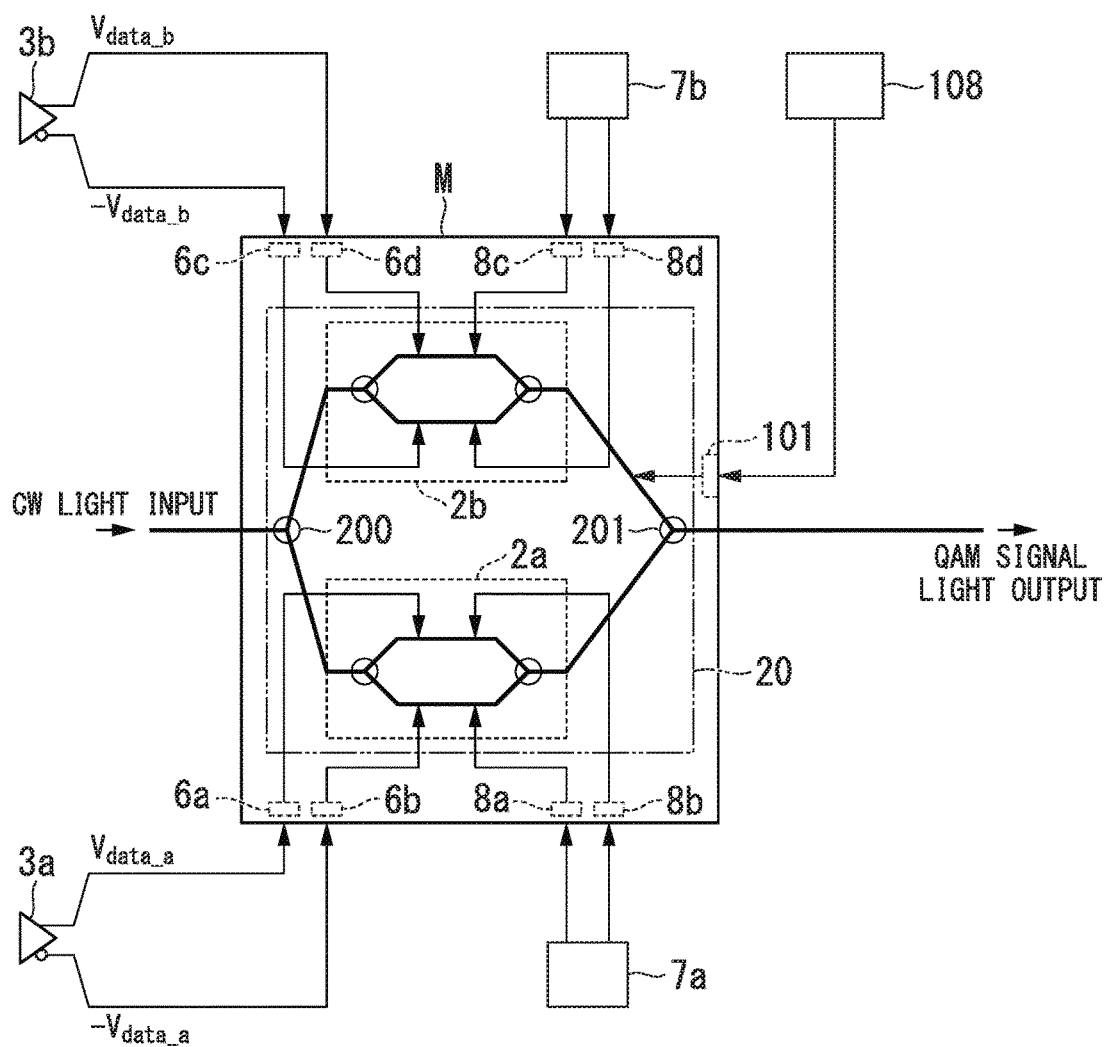
FIG. 15 is a diagram illustrating a typical structure of a conventional QAM signal-generating optical transmitter.

In the embodiments described below, the constituent elements that are the same as constituent elements in the optical transmitter illustrated in FIG. 15 or constituent elements in other embodiments are assigned the same reference signs and redundant explanations thereof may be omitted.

First Embodiment

Figure 1:
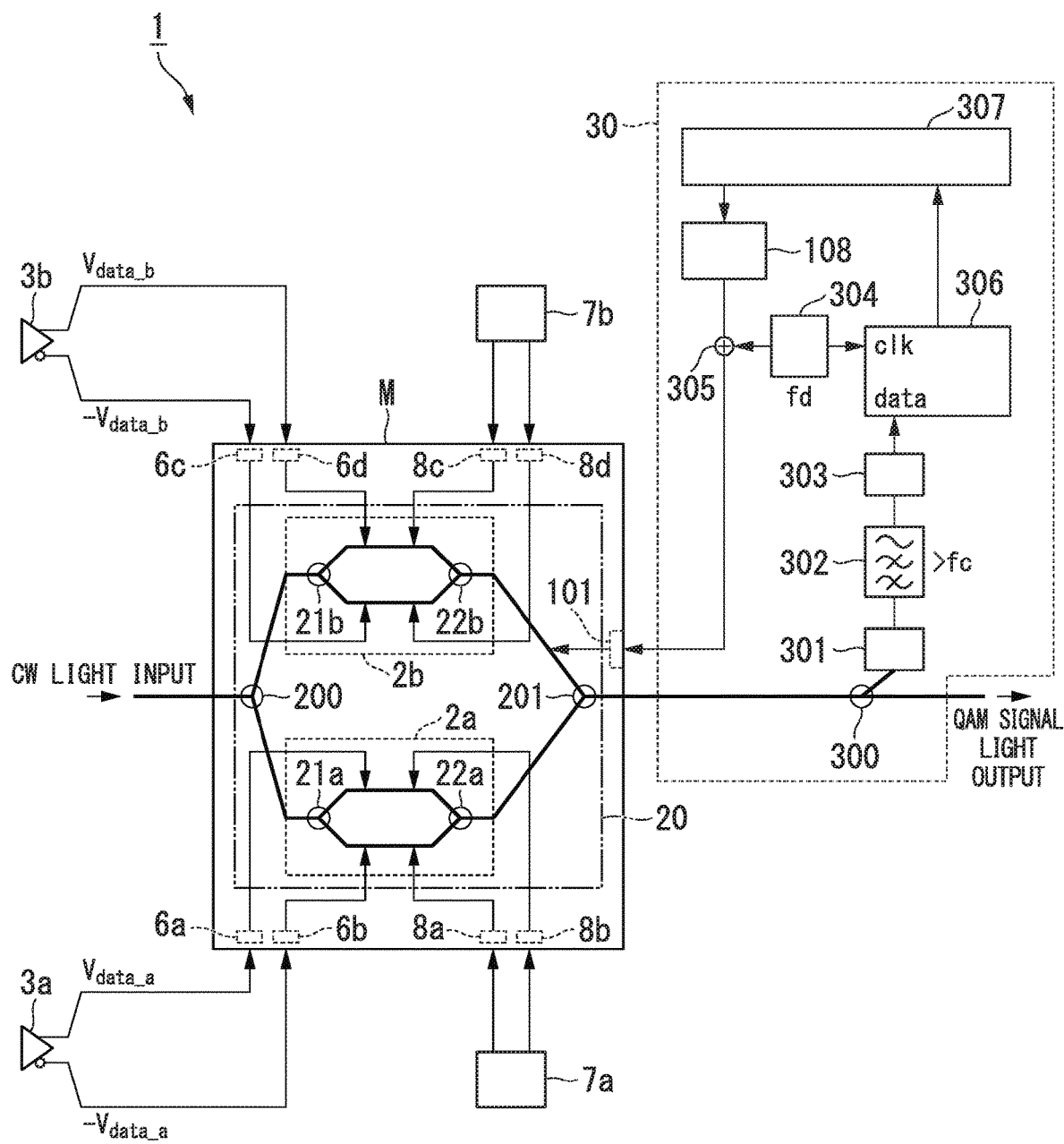
FIG. 1 is a diagram illustrating the structure of a first embodiment of the present invention.

FIG. 1 is a diagram showing an example of the structure of an optical transmitter 1 according to the first embodiment. The optical transmitter 1 according to the first embodiment includes the quadrature amplitude modulation (QAM) signal-generating optical modulator M shown in FIG. 15, an in-phase Mach-Zehnder interferometer (MZI) control bias voltage generator 7a, a quadrature MZI control bias voltage generator 7b, and also an automatic bias voltage adjustment (ABC) circuit 30. The ABC circuit 30 includes the parent MZI control bias voltage generator 108 in FIG. 15 and controls the parent MZI control bias voltage generator 108.

The optical modulator M is a semiconductor optical modulator using nested MZIs, including a parent MZI 20, a first in-phase drive signal input electrode 6a, a second in-phase drive signal input electrode 6b, a first quadrature drive signal input electrode 6c, a second quadrature drive signal input electrode 6d, a first in-phase MZI control bias electrode 8a, a second in-phase MZI control bias electrode 8b, a first quadrature MZI control bias electrode 8c, a second quadrature MZI control bias electrode 8d, and a parent MZI control bias electrode 101. The parent MZI 20 includes an optical splitting unit 200 (optical input terminal), an in-phase MZI 2a, a quadrature MZI 2b, and an optical multiplexing unit 201 (optical output terminal).

CW light is input to the optical splitting unit 200. The optical splitting unit 200 splits the input CW light and outputs the split CW light to the in-phase MZI 2a and the quadrature MZI 2b.

The splitting unit 21a (first splitting unit) in the in-phase MZI 2a splits the CW light that is input from the optical splitting unit 200 into two branches. The first in-phase drive signal input electrode 6a and the second in-phase drive signal input electrode 6b apply drive signals±$V_{data\_a}$ generated by the in-phase drive amplifier 3a to respective optical signals of the branches of the in-phase MZI 2a. The first in-phase MZI control bias electrode 8a and the second in-phase MZI control bias electrode 8b each adjust the optical phase difference between the optical signals of the two branches of the in-phase MZI 2a by means of the output voltages from the in-phase MZI control bias voltage generator 7a so as to bias the in-phase MZI 2a at the null point. The multiplexing unit 22a (first multiplexing unit) in the in-phase MZI 2a multiplexes the optical signals of the two branches having the adjusted optical phase difference, and outputs the multiplexed optical signal to the optical multiplexing unit 201.

The splitting unit 21b (second splitting unit) in the quadrature MZI 2b splits the CW light that is input from the optical splitting unit 200 into two branches. The first quadrature drive signal input electrode 6c and the second quadrature drive signal input electrode 6d apply drive signals±$V_{data\_b}$ generated by the quadrature drive amplifier 3b to respective optical signals of the branches of the quadrature MZI 2b. The first quadrature MZI control bias electrode 8c and the second quadrature MZI control bias electrode 8d adjust the optical phase difference between the optical signals of the two branches of the quadrature MZI 2b by means of the output voltages from the quadrature MZI control bias voltage generator 7b so as to bias the quadrature MZI 2b at the null point. The multiplexing unit 22b (second multiplexing unit) in the quadrature MZI 2b multiplexes the optical signals of the two branches having the adjusted optical phase difference, and outputs the multiplexed optical signal to the optical multiplexing unit 201.

The optical signal output from the in-phase MZI 2a and the optical signal output from the quadrature MZI 2b are input to and multiplexed in the optical multiplexing unit 201, and the multiplexed optical signal is output from the optical modulator M.

In an actual optical transmitter, an ABC circuit is also necessary for controlling the in-phase MZI control bias voltage generator 7a and the quadrature MZI control bias voltage generator 7b, but it is omitted from the drawings relating to the present embodiment. As will be explained in connection with the eighth embodiment below, the ABC circuit for controlling these two bias voltages can be realized by means of publicly known art as described, for example, in Non-Patent Document 1.

As mentioned above, the in-phase MZI control bias and the quadrature MZI control bias can be easily optimized in comparison to the parent MZI control bias voltage. Therefore, it is preferable to optimize the in-phase MZI control bias and the quadrature MZI control bias in the stages before controlling the parent MZI control bias voltage. Therefore, before control of the parent MZI control bias voltage commences, a controller 307 of the ABC circuit 30, explained below, adjusts both (or at least one) of the in-phase MZI control bias voltages that are applied to the first in-phase MZI control bias electrode 8a and the second in-phase MZI control bias electrode 8b, and the quadrature MZI control bias voltages that are applied to the first quadrature MZI control bias electrode 8c and the second quadrature MZI control bias electrode 8d. Due to this preprocessing, it is possible to raise the convergence speed of the parent MZI control bias voltage.

The ABC circuit 30 for controlling the parent MZI control bias voltage generator 108 includes an optical tap 300, a photodetector 301, a high-pass filter (HPF) 302, an RMS monitor 303, a dithering unit 304, a dithering application unit 305, a synchronous detection circuit 306, and the controller 307 (control unit).

The optical tap 300 splits the optical signal output from the optical modulator M and outputs the split optical signal to the photodetector 301. The optical signal output from the optical tap 300 is input to the photodetector 301. The photodetector 301 converts the input optical signal into an electrical signal and outputs the converted electrical signal to the HPF 302. In this case, as mentioned in the explanation relating to FIG. 16(b), the electrical signal output from the photodetector 301 has large and small notches corresponding to the transitions between symbols. The electrical signal output from the photodetector 301 is input to the HPF 302, which suppresses modulation components that are slower than the cut-off frequency fc, and outputs the resulting electrical signal to the RMS monitor 303. The electrical signal output by the HPF 302 is input to the RMS monitor 303, which detects changes in the RMS and outputs the information (data) resulting from the measurement to the synchronous detection circuit 306.

The dithering unit 304 and the dithering application unit 305 apply dithering to the parent MZI control bias voltage at the frequency fd. It is assumed here that fc>fd. The synchronous detection circuit 306 performs synchronous detection of the electrical signal converted in the photodetector 301 on the basis of the measurement results from the RMS monitor 303 and a reference clock signal (clk) output from the dithering unit 304. The controller 307 determines whether or not the parent MZI control bias voltage is optimal on the basis of the synchronous detection results output from the synchronous detection circuit 306, and if the parent MZI control bias voltage is not optimal, implements ABC by correcting the output of the parent MZI control bias voltage generator 108.

Figure 2:
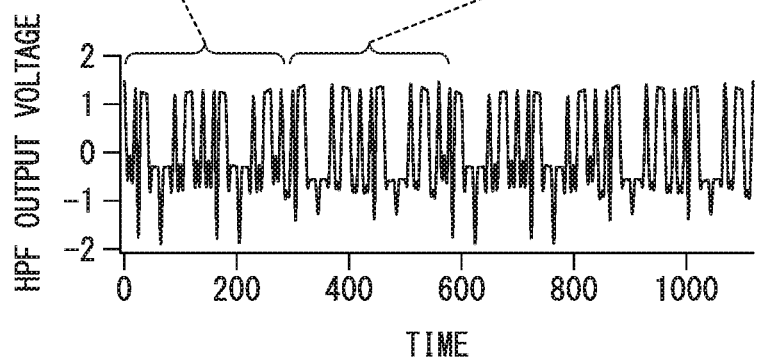
FIG. 2 is a diagram illustrating the operations of the first embodiment.
Figure 2:
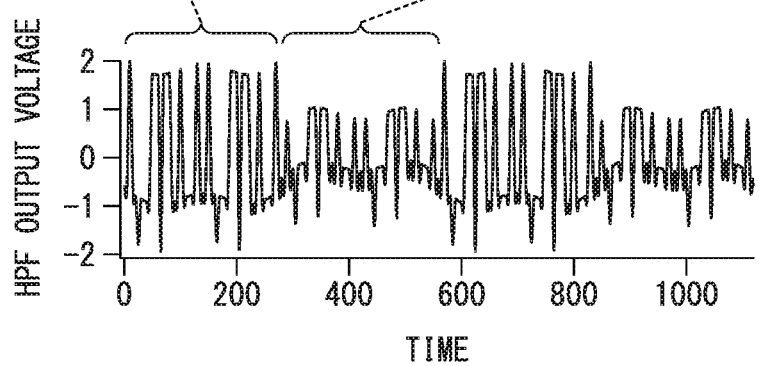

FIG. 2 is a drawing that shows a simulation of the operations of the HPF 302 and the RMS monitor 303. The simulation conditions are the same as those in FIG. 18. In other words, the QAM is quaternary QPSK and dithering is applied to the parent MZI control bias voltage. It is assumed that the optical modulator is not ideal, and that the photodetector (PD) has a band that is about the same as the QAM symbol rate. Additionally, the conditions were such that the modulator loss slightly decreases (or increases) when θ is slightly increased (or decreased). θ is the optical phase difference between the optical output of the in-phase MZI 2a and the optical output of the quadrature MZI 2b.

Figure 18:
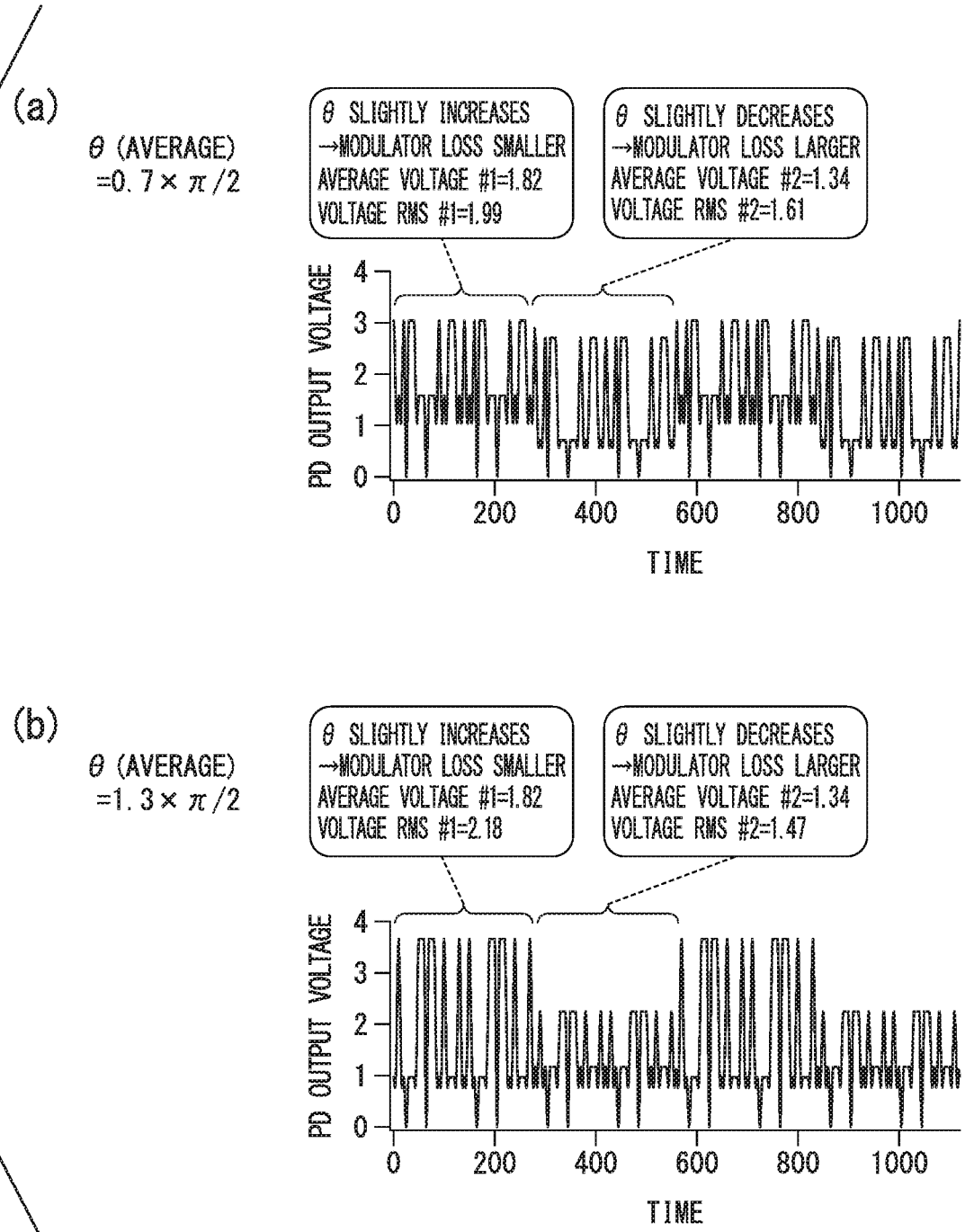
FIG. 18 is a diagram illustrating constellations and PD output voltage waveforms for optical QAM signals from a conventional QAM signal-generating optical transmitter using a non-ideal optical modulator, when dithering is applied to the parent MZI control bias voltage.

In the present embodiment, dithering is applied to the parent MZI control bias voltage at the frequency fd, so θ repeatedly undergoes slight increases and decreases at the frequency fd. In FIG. 2 and FIG. 18, the simulations and drawings are prepared so as to exaggerate the increase and decrease in θ in order to aid in understanding. However, when operating the ABC circuit 30 in-service, it is necessary to keep the dithering amplitude at a level at which the signal quality of the QAM signal is not degraded. However, it is possible to use a configuration wherein the dithering amplitude is made large only during the startup period of the optical transmitter 1, and the error detection sensitivity is raised so as to make the biases quickly converge to the optimum values. Thus, the dithering amplitude may be made large during the startup sequence of the optical transmitter 1 and made smaller during the operating period.

Figure 17:
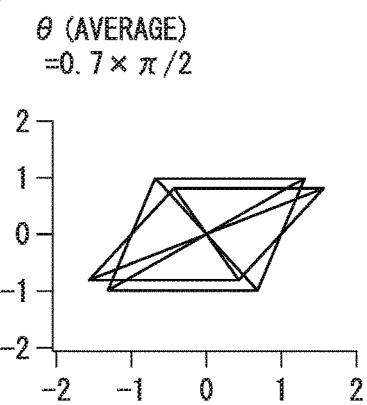
FIG. 17 is a diagram illustrating constellations and PD output voltage waveforms for optical QAM signals from a conventional QAM signal-generating optical transmitter, when dithering is applied to the parent MZI control bias voltage.
Figure 17:
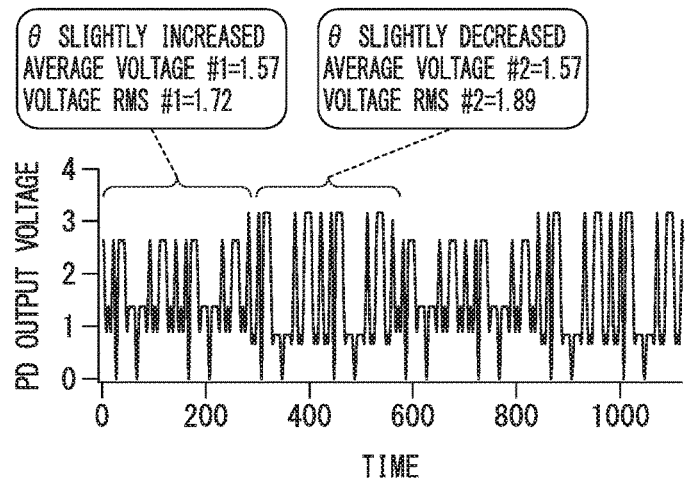
Figure 17:
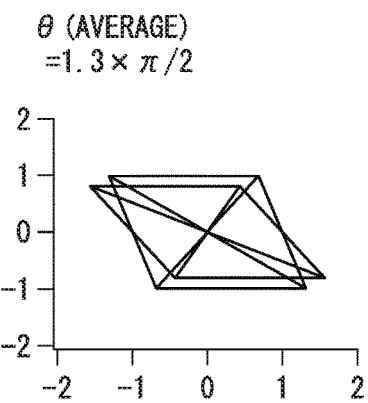
Figure 17:
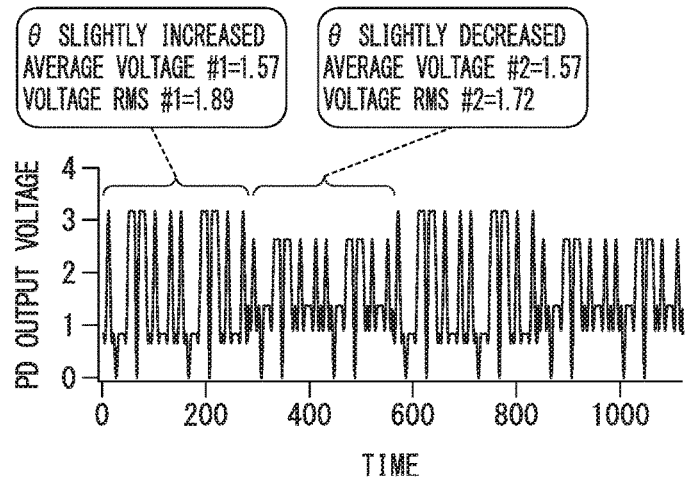

Since a non-ideal optical modulator is assumed in FIG. 2 and FIG. 18, as already explained in connection with FIG. 18, the average value of the output voltages of the photodetector 301 in the time regions in which θ is slightly increased (average voltage #1 shown in FIG. 18) differs from the average value of the output voltages of the photodetector 301 in the time regions in which θ is slightly decreased (average voltage #2 shown in FIG. 18). However, since the HPF 302 cuts off frequency components of fc or lower, as shown in FIG. 2, the values of average voltage #1 and average voltage #2 in the output of the HPF 302 are approximately 0. In contrast, the RMS of the output voltages of the HPF 302 in the time regions in which θ is slightly increased (RMS #1) is not identical to the RMS of the output voltages of the HPF 302 in the time regions in which θ is slightly decreased (RMS #2). While RMS #1<RMS #2 when the average value of θ is 0.7×π/2, RMS #1>RMS #2 when the average value of θ is 1.3×π/2. As in the case in which an ideal optical modulator is used, as shown in FIG. 17, the relationship between the magnitudes of RMS #1 and RMS #2 inverts depending on whether θ is larger or smaller than the optimum value. When θ is at the optimum value, both RMS #1 and RMS #2 are at their minimum values.

The changes in the RMS are detected by the RMS monitor 303, the detection results are synchronously detected by the synchronous detection circuit 306, and it is determined whether the change in the RMS and the dithering signal fd are in-phase or in antiphase. When θ is at the optimum value, the synchronous detection result becomes 0. The controller 307 feeds back these synchronous detection results to the parent MZI control bias voltage generator 108, and maintains the parent MZI control bias voltage and θ at their optimum values.

In this way, the ABC circuit 30 performs a process of applying dithering to the parent MZI control bias voltage at a frequency fd which is lower than the frequency fc, and a process of synchronously detecting the output signal from the HPF 302 at the frequency fd, and controlling the parent MZI control bias voltage generator 108 so that the synchronous detection result is 0 (or a value close to 0).

If dithering or synchronous detection is made difficult for some reason, the controller 307 may slightly change the parent MZI control bias voltage and implement control so as to minimize the RMS by means of a hill climbing method. At this time, the controller 307 should preferably perform statistical processing of the RMS over a time range that is longer than 1/fc. This is because, in the signal at the time of input to the controller 307, random noise having frequency components from 0 to fc are suppressed by the HPF 302.

Second Embodiment

By looking closely at the HPF output voltage waveform shown in FIG. 2 and drawing an envelope line along the upper end and an envelope line along the lower end, it can be seen that they fluctuate at the frequency fd. However, since the envelope line along the upper end and the envelope line along the lower end are in antiphase, the HPF output does not have any intensity-modulated components at the frequency fd. In the second embodiment, it is determined whether or not θ is at the optimum value by selectively extracting one of the envelope lines.

Figure 3:
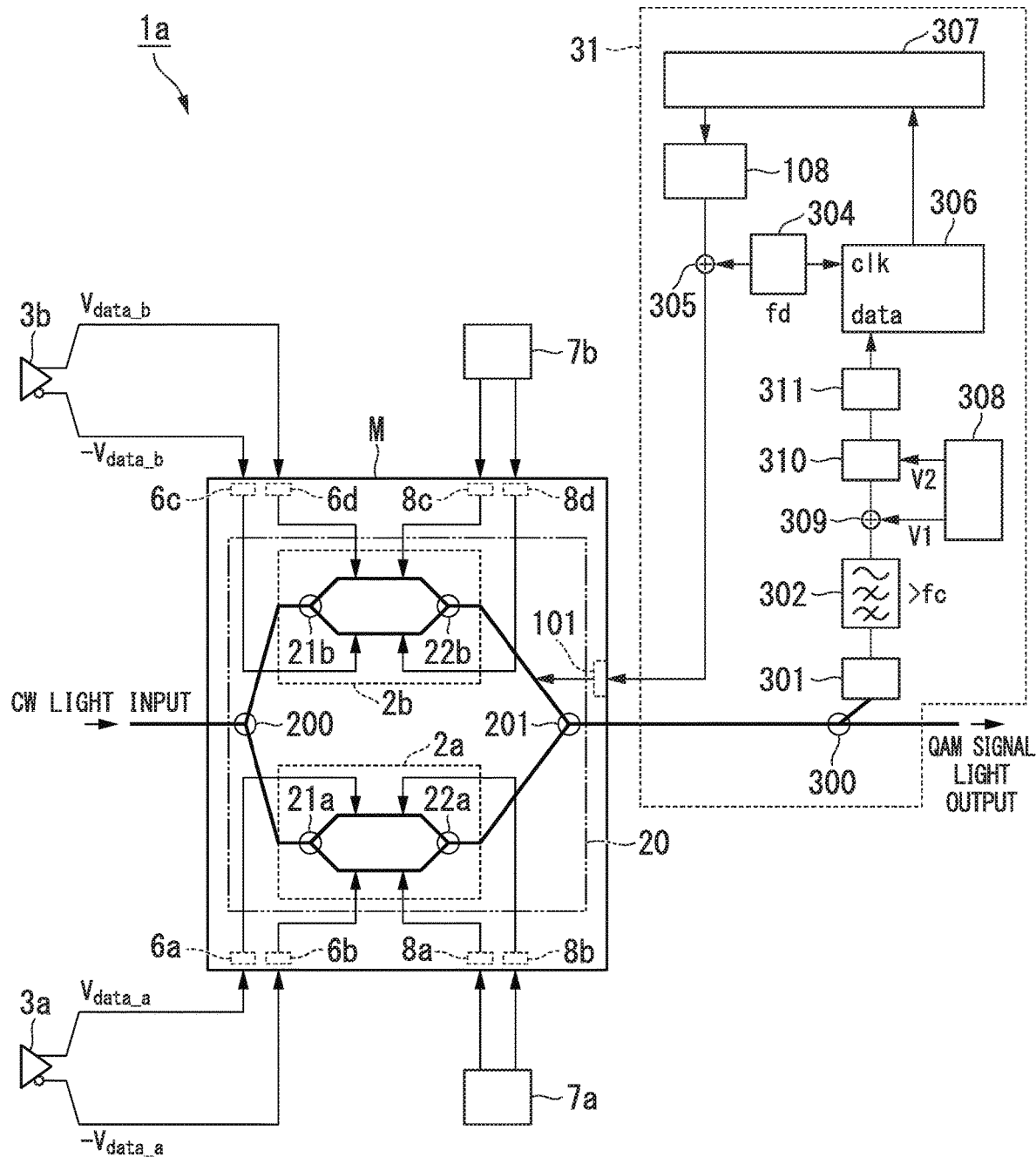
FIG. 3 is a diagram illustrating the structure of a second embodiment.

FIG. 3 is a drawing that shows an example of a configuration of an optical transmitter 1a according to the second embodiment. The optical transmitter 1a according to the second embodiment differs from the optical transmitter 1 according to the first embodiment shown in FIG. 1 in that an ABC circuit 31 is provided instead of the ABC circuit 30. The ABC circuit 31 differs from the ABC circuit 30 in that a DC power supply 308, a voltage adder 309, a clipper circuit 310, and a smoothing circuit 311 are provided instead of the RMS monitor 303 in the first embodiment.

The DC power supply 308 adds a DC voltage V1 to the output of the HPF 302 by means of the voltage adder 309. The output of the HPF 302 generally spans from positive to negative, but compact optical transmitters often have restrictions on the power supply so that, for an active circuit, the circuit configuration can sometimes be made simpler by limiting the input/output voltage to be either positive or negative. In such a case, the output of the voltage adder 309 can be limited to be either positive or negative by configuring the HPF 302 as a passive circuit and appropriately choosing the DC voltage V1.

The output of the voltage adder 309 is input to the clipper circuit 310. The clipper circuit 310 refers to a voltage V2 output from the DC power supply 308 and implements, on the output of the voltage adder 309, a clipping process having the voltage V2 as the threshold value. In this case, the voltage V2 is made substantially the same as the DC voltage V1, but it does not need to be identical to the DC voltage V1, and the value of the voltage V2 is chosen so as to maximize the error detection sensitivity.

Figure 16:
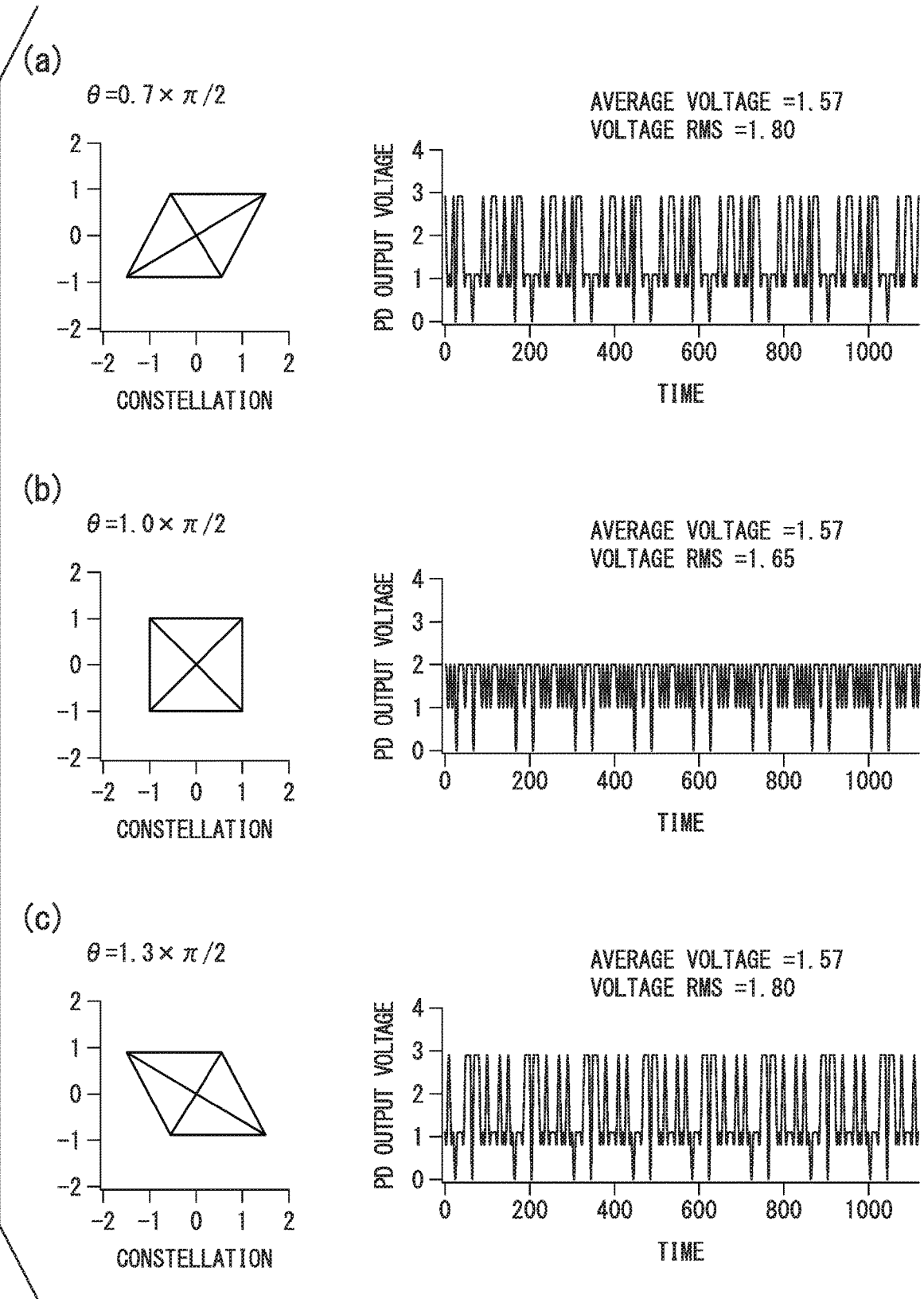
FIG. 16 is a diagram illustrating constellations and PD output voltage waveforms for optical QAM signals from a conventional QAM signal-generating optical transmitter.

Here, there are two choices for the clipping process. To be specific, these two clipping processes are a process of clipping voltages higher than the voltage V2 at the voltage V2, and a process of clipping voltages lower than the voltage V2 at the voltage V2. In the intensity waveform of an optical QAM signal, notches are formed when transitioning between symbols as shown in FIG. 16, and these notches are formed regardless of the magnitude of θ, so it is better to suppress the notches in order to achieve precise ABC. For this reason, it is preferable to use the process of clipping voltages lower than the voltage V2, output from the photodetector 301, at the voltage V2.

Figure 4:
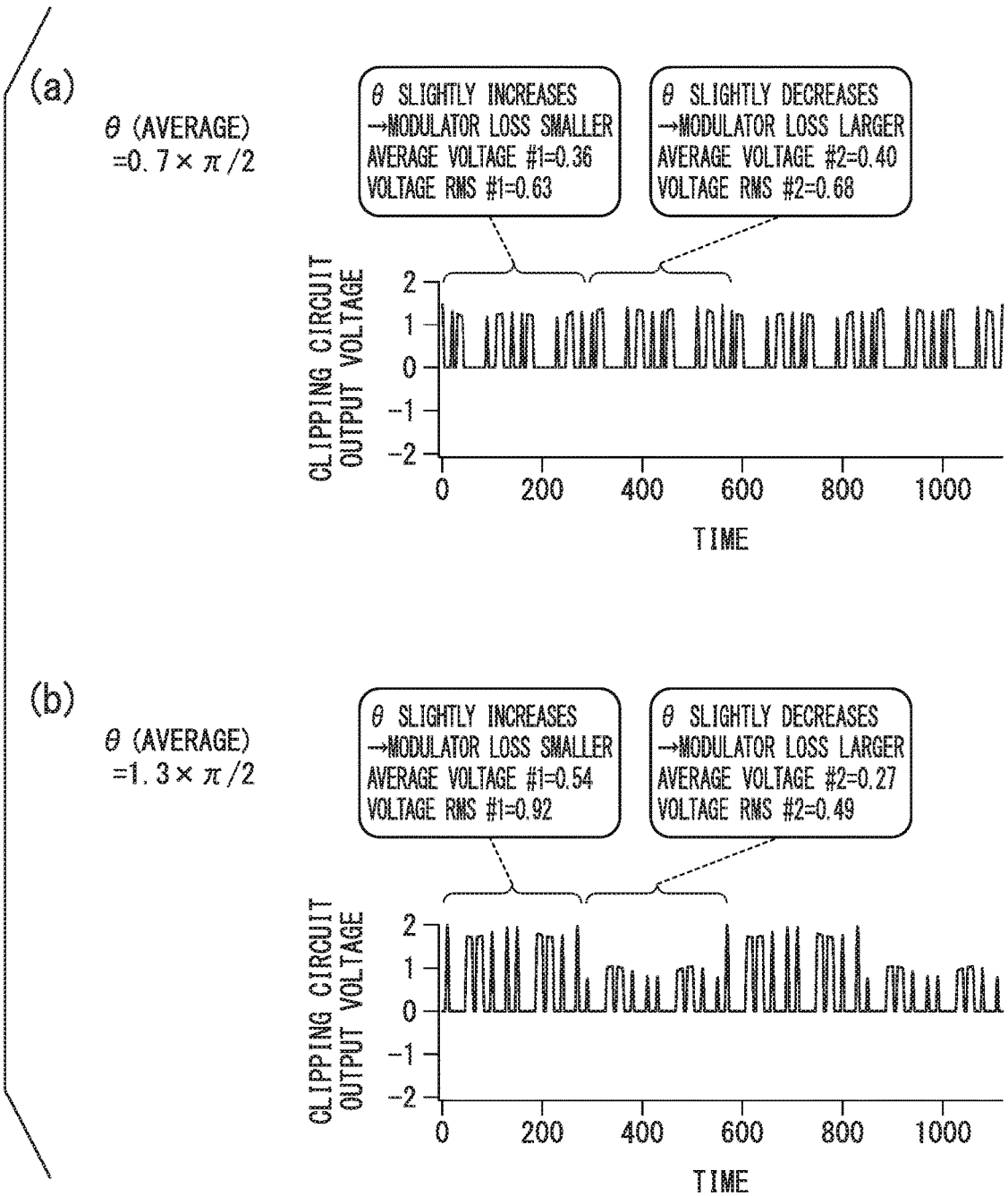
FIG. 4 is a diagram illustrating the operations of the second embodiment.

FIG. 4 is a drawing that shows a simulation of the operation of the output waveform of the clipper circuit 310 when V1=V2=0. The conditions of the simulation are the same as those in FIG. 2 and FIG. 18. The average value of the output voltages of the clipper circuit 310 in the time regions in which θ is slightly increased (average voltage #1) differs from the average value of the output voltages of the output of the clipper circuit 310 in the time regions in which θ is slightly decreased (average voltage #2). Similarly, the RMS of the output voltages of the clipper circuit 310 in the time regions in which θ is slightly increased (RMS #1) differs from the RMS of the output voltages of the clipper circuit 310 in the time regions in which θ is slightly decreased (RMS #2). While average voltage #1<average voltage #2 and RMS #1<RMS #2 when θ is smaller than the optimum value π/2, when θ is larger than the optimum value π/2, average voltage #1>average voltage #2 and RMS #1>RMS #2, so the relationship between the magnitudes thereof is inverted. While it is possible determine whether θ is larger or smaller than the optimum value by synchronously detecting the change in the RMS in the same manner as in the first embodiment, it is also possible, in the second embodiment, to determine whether θ is larger or smaller than the optimum value by synchronously detecting the change in the average voltage. As mentioned above, it is necessary for the band of the ABC circuit 31 to be made higher in order to detect the changes in the RMS. However, the requirements on the band are laxer for detecting changes in the average voltage, so it is more preferable to synchronously detect changes in the average voltage.

In the output waveform of the clipper circuit 310, the frequency components that are sufficiently higher than fd are smoothed by the smoothing circuit 311. The smoothing circuit 311 can be formed from a low-pass filter for which the cut-off frequency is sufficiently higher than fd. It is also possible to use, instead of a low-pass filter, a bandpass filter having the transmission band at fd. The output of the smoothing circuit 311 is synchronously detected by the synchronous detection circuit 306 and the controller 307 determines whether θ is larger or smaller than the optimum value, in the same manner as in the first embodiment. If θ is at the optimum value, then the synchronous detection result becomes 0. The controller 307 feeds this result back to the parent MZI control bias voltage generator 108 and maintains the parent MZI control bias voltage and θ at their optimum values.

In this embodiment also, if dithering or synchronous detection is made difficult for some reason, it is possible to slightly change the parent MZI control bias voltage and implement control so as to minimize the average voltage or RMS by means of a hill climbing method. At this time, it is likewise preferable for the controller 307 to perform statistical processing of the average voltage or the RMS over a time range that is longer than 1/fc.

Third Embodiment

In the first and second embodiments, the cut-off frequency fc of the HPF 302 is set to be higher than the dithering frequency fd. It is possible to set fc so that the HPF 302 suppresses not only the fd component, but also random noise in the optical transmitter 1 or the optical transmitter 1a. In this case, fc is set so that the HPF 302 cuts off all or part of the noise spectrum generated due to random noise in the electrical circuitry such as fluctuations in the in-phase drive amplifier 3a, the quadrature drive amplifier 3b, or the power supply system, and intensity-modulated noise in the CW light source.

Fourth Embodiment

Figure 5:
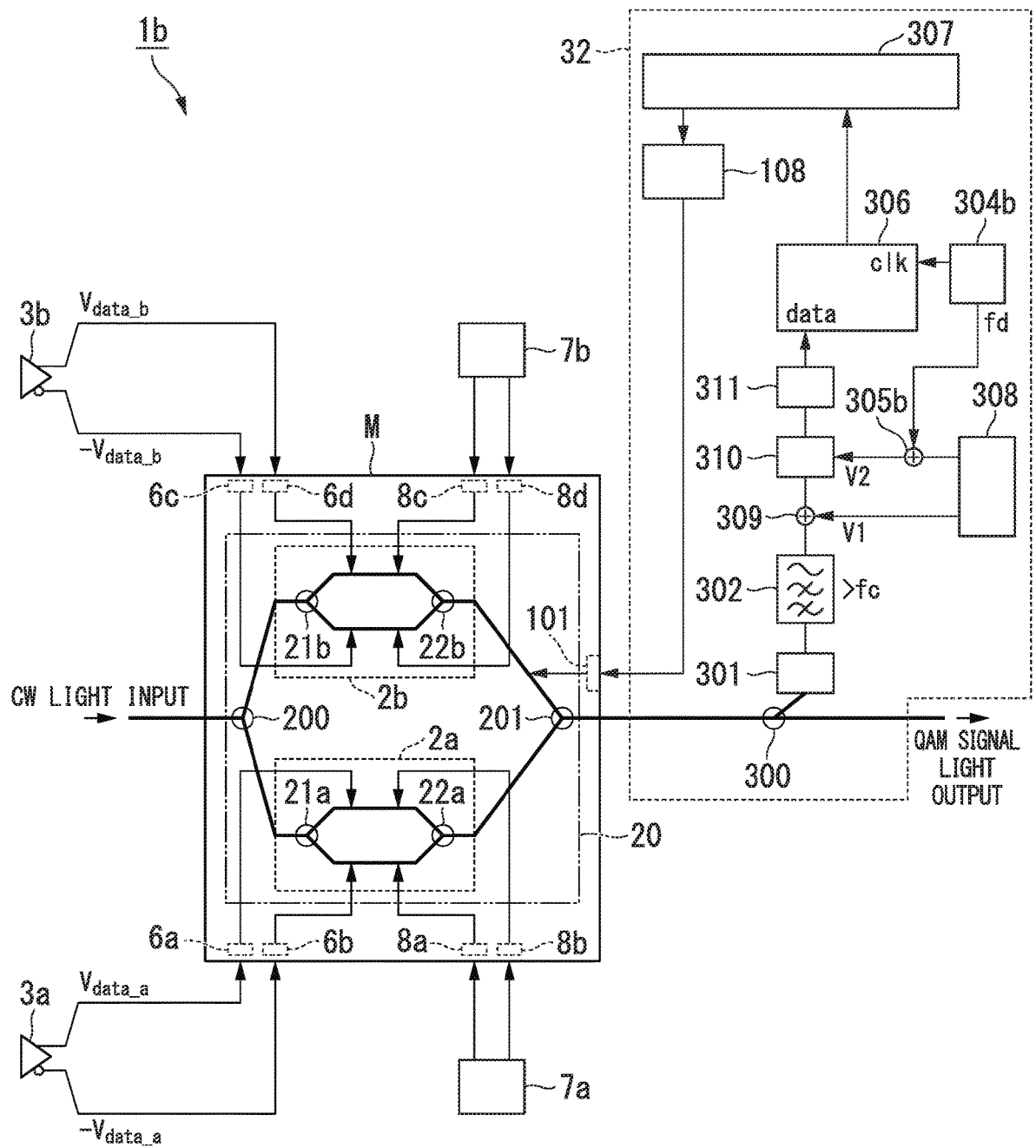
FIG. 5 is a diagram illustrating the structure of a fourth embodiment.

FIG. 5 is a drawing that shows an example of a configuration of an optical transmitter 1b according to the fourth embodiment. The optical transmitter 1b according to the fourth embodiment differs from the optical transmitter 1a according to the second embodiment shown in FIG. 3 in that an ABC circuit 32 is provided instead of the ABC circuit 31. The ABC circuit 32 differs from the ABC circuit 31 of the second embodiment in that a dithering unit 304b and a dithering application unit 305b that apply dithering, at the frequency fd, to the voltage V2 output from the DC power supply 308 are provided instead of the dithering unit 304 and the dithering application unit 305 that apply dithering to the parent MZI control bias voltage at the frequency fd. The dithering unit 304b outputs a reference clock signal (clk) to the synchronous detection circuit 306 and applies dithering, at the frequency fd, to the clipping threshold value of the clipper circuit 310 by means of the dithering application unit 305b. The output from the clipper circuit 310 is smoothed by the smoothing circuit 311 to obtain a periodic signal having the frequency fd. The output of the smoothing circuit 311 is synchronously detected by the synchronous detection circuit 306. The controller 307 feeds the synchronous detection results back to the parent MZI control bias voltage generator 108, and maintains the parent MZI control bias voltage and θ at their optimum values.

Figure 6:
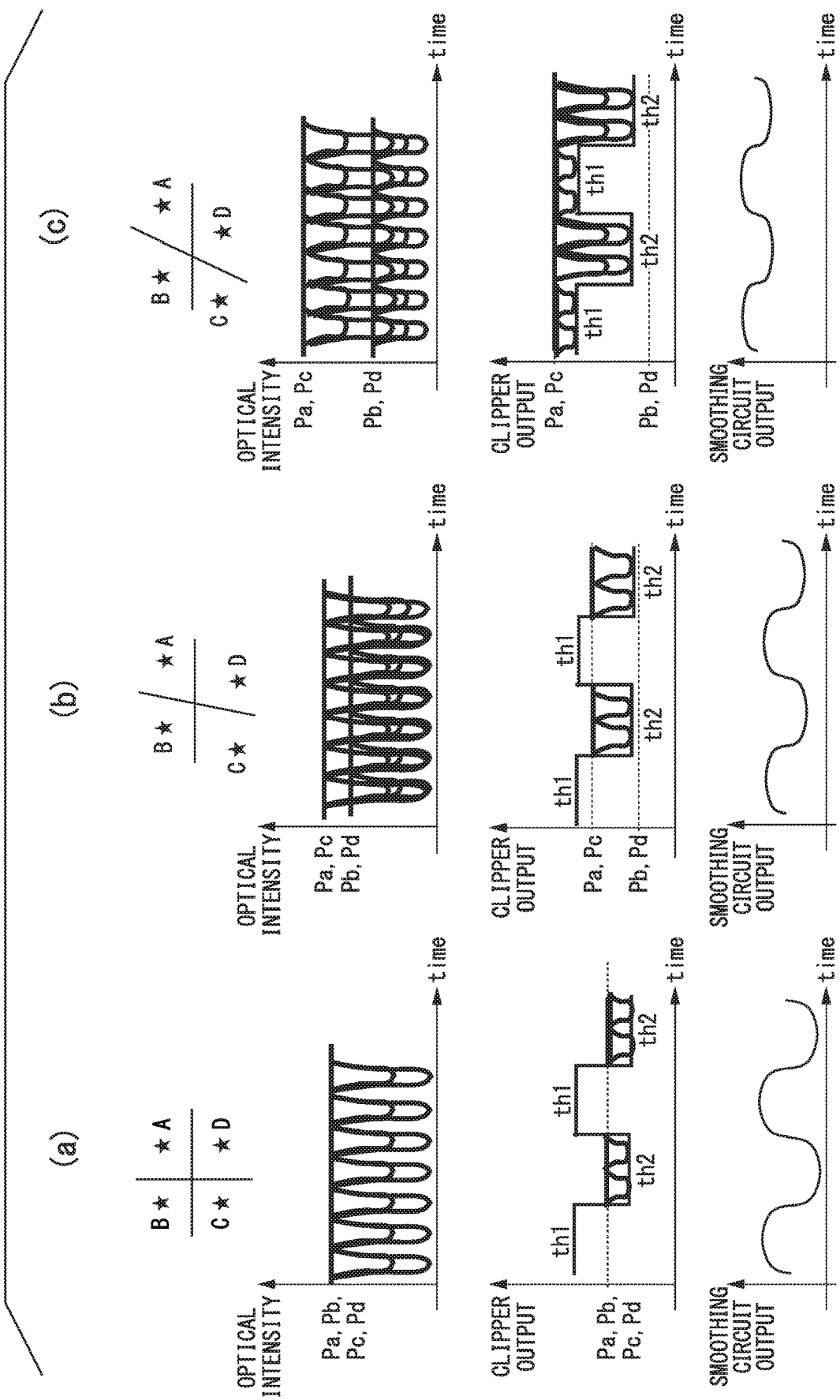
FIG. 6 is a diagram schematically illustrating the output of a clipper circuit in the fourth embodiment.

FIG. 6 is a diagram schematically showing the output of the clipper circuit 310 according to the fourth embodiment. In this case, it is assumed that due to the dithering, the clipping threshold value of the clipper circuit 310 repeats two values th1 and th2 at the frequency fd. Additionally, it is assumed that the QAM signal is quaternary, i.e., a QPSK signal.

As shown in FIG. 6(a), when the parent MZI control bias voltage and θ are optimal, each of the four symbols A, B, C, and D in QPSK has the same optical power Pa, Pb, Pc, and Pd. In FIG. 6, the threshold values th1 and th2 of the clipper circuit 310 fulfill the relationship th1>Pa, Pb, Pc, Pd≥th2, but do not always need to have this relationship. Additionally, the clipping threshold values may vary sinusoidally.

As shown in FIG. 6(b), when the parent MZI control bias voltage and θ begin to be detuned, the optical powers Pb and Pd of the symbol B and the symbol D become lower, but the output of the clipper circuit 310 never becomes less than th2. In contrast, the optical powers Pa and Pc of the symbol A and the symbol C rise, so the average voltage during the periods at the threshold value th2 rises. As shown in FIG. 6(c), when the parent MZI control bias voltage and θ are detuned further, the optical powers Pa and Pc exceed th1, so the maximum voltage output from the clipper circuit 310 becomes constant.

When the output of the clipper circuit 310 is supplied to the smoothing circuit 311, a periodic signal having the frequency fd is obtained, and the amplitude thereof is the highest when the parent MZI control bias voltage and θ are optimal. However, the average value obtained by averaging the output voltages of the clipper circuit 310 over a time longer than 1/fd is the smallest when the parent MZI control bias voltage and θ are optimal.

The output of the smoothing circuit 311 is synchronously detected by the synchronous detection circuit 306. In the present embodiment, the synchronous detection results are such that the absolute value is the highest when the parent MZI control bias voltage and θ are optimal. While the sign of the synchronous detection results depends on the phase difference between the reference clock signal received by the synchronous detection circuit 306 and the dithering applied by the dithering application unit 305b, whether the sign is positive or negative is determined at the time of circuit design, so it is possible to define a target value for the synchronous detection results when optimizing θ.

The controller 307 controls the parent MZI control bias voltage generator 108 so that the synchronous detection result has the abovementioned target value. In the present embodiment, it is not possible to determine directly whether the parent MZI control bias voltage is excessive or deficient. For this reason, the controller 307 may implement control to alternately repeat steps of slightly changing the parent MZI control bias voltage and obtaining synchronous detection results, while performing a hill climbing method and choosing the parent MZI control bias voltage so that the synchronous detection results approach the above-mentioned target value.

The smoothing circuit 311 can be formed from a low-pass filter having a cut-off frequency that is sufficiently higher than fd. A bandpass filter having the transmission band at fd may be used instead of the low-pass filter.

In the present embodiment, the parent MZI control bias voltage is not dithered at the frequency fd, so even in the case of a non-ideal optical modulator, intensity-modulated components having the frequency fd will not be generated in the output of the photodetector 301. For this reason, there is no detrimental influence on the synchronous detection results as shown in FIG. 18.

Additionally, in the present embodiment, dithering is performed in a stage after the HPF 302, so it is not necessary to make the cut-off frequency fc of the HPF 302 higher than the dithering frequency fd, but fc may still be set so that the HPF 302 suppresses random noise in the optical transmitter 1b. Alternatively, instead of the HPF 302 and the voltage adder 309, a gain control amplifier that holds the average voltage averaged over a time range longer than 1/fd so as to always remain constant may be provided on the input-side of the clipper circuit 310.

Fifth Embodiment

In the second embodiment, a non-ideal optical modulator is assumed, and an HPF 302 and a clipper circuit 310 are used in combination in order to suppress variations in the modulator insertion loss. However, if the modulator response is close enough to ideal and a PD output voltage such as that shown in FIG. 17 is obtained, then the HPF 302 may be omitted from the second embodiment.

Figure 7:
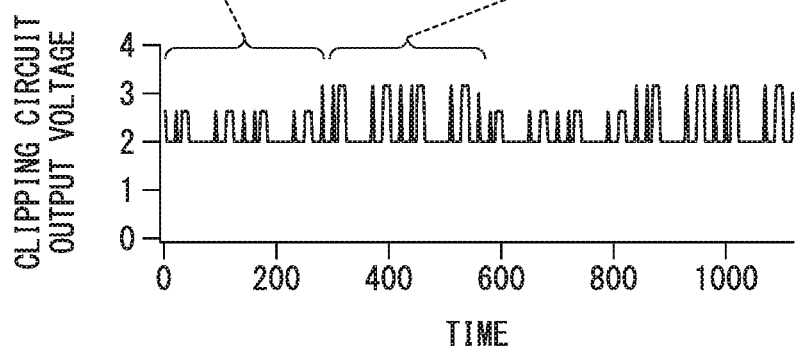
FIG. 7 is a diagram illustrating the operations of a fifth embodiment.
Figure 7:
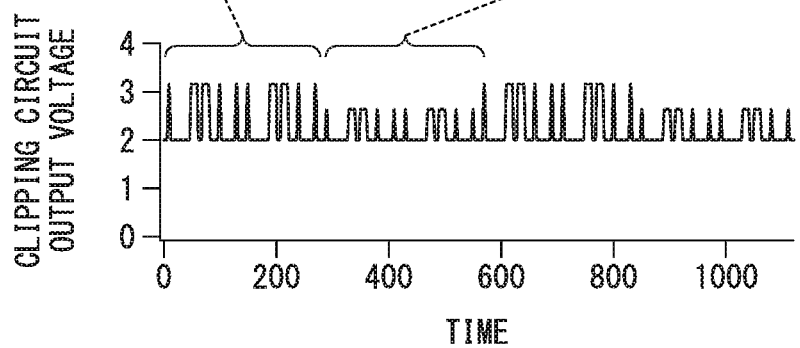

FIG. 7 is a drawing showing a simulation of the output of the clipper circuit 310 when the HPF 302 is omitted from the second embodiment and V1=0 and V2=2. The conditions of the simulation are the same as those in FIG. 17. It can be seen that, as with the second embodiment, when θ is smaller than the optimum value π/2, average voltage #1<average voltage #2, but when θ is larger than the optimum value π/2, average voltage #1>average voltage #2, so the relationship between the magnitudes thereof is inverted. As a result thereof, it is possible to determine whether θ is greater than or less than the optimum value, in the same manner as in the second embodiment.

Sixth Embodiment

Figure 8:
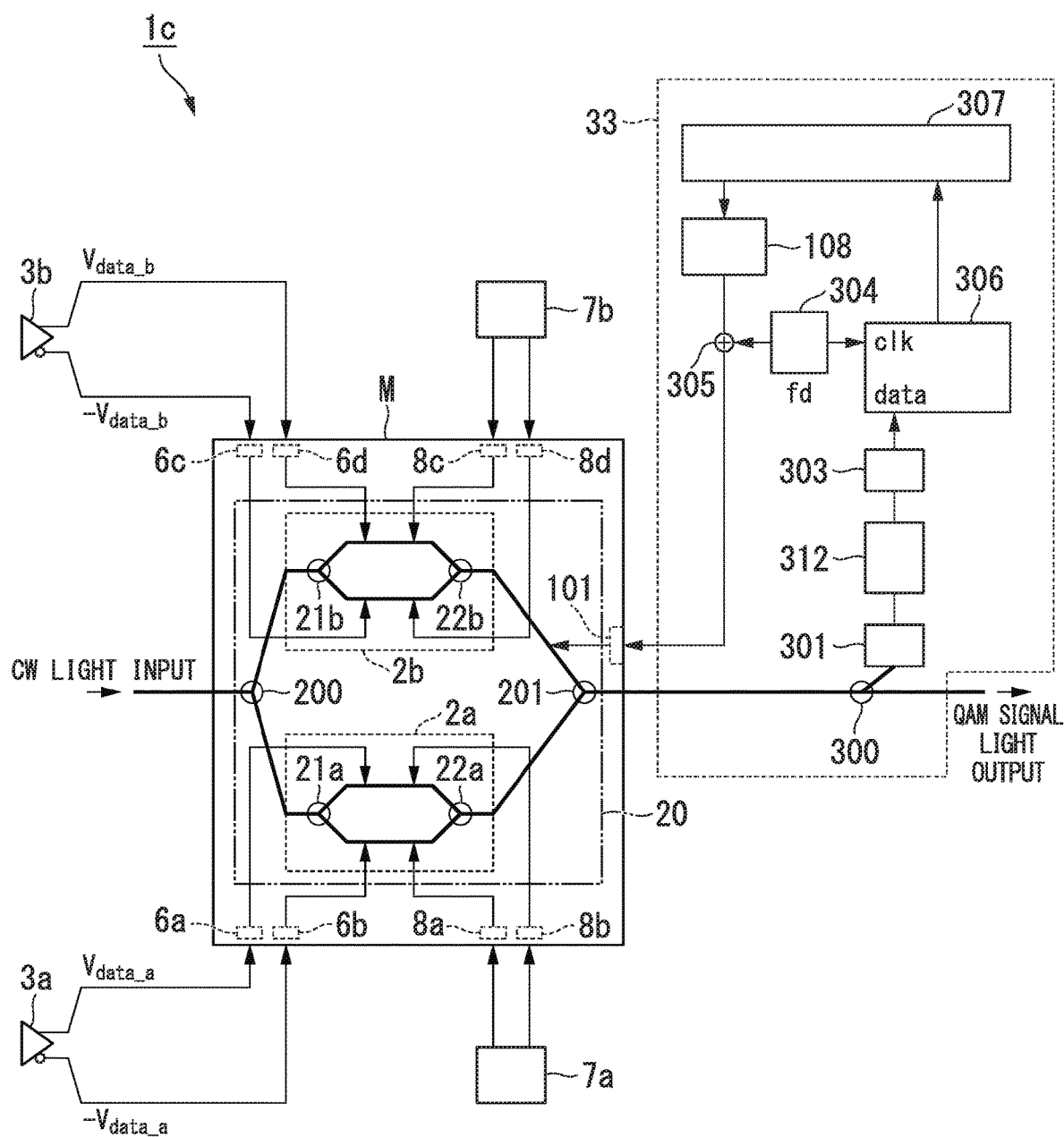
FIG. 8 is a diagram illustrating the structure of a sixth embodiment.

In the first and second embodiments, the modulation components of fc or lower are suppressed and the dithering frequency components at the frequency fd are suppressed by the HPF 302. It is possible to use, instead of the HPF 302, an RF amplifier having a response speed of fc or lower and having a gain adjustment function. FIG. 8 is a drawing that shows an example of the configuration of an optical transmitter 1c according to the sixth embodiment. It is to be noted that in FIG. 8, an example of a configuration based on the first embodiment is shown. The optical transmitter 1c in the sixth embodiment differs from the optical transmitter 1 in the first embodiment shown in FIG. 1 in that an ABC circuit 33 is provided instead of the ABC circuit 30, and an RF amplifier 312 is provided instead of the HPF 302. The case in which a PD output voltage as shown in FIG. 18 is input to the RF amplifier 312 will be considered. Since the dithering frequency fd is lower than fc, the gain adjustment function is able to change the gain so as to compensate for the variation in average voltage #1 and average voltage #2 illustrated in FIG. 18. In other words, during the periods in which θ is slightly decreased in FIG. 18, the gain is set to 115% of the normal value (in this case, 1.82/((1.82+1.34)/2)×100=115), and during the periods in which θ is slightly increased, the gain is set to 85% of the normal value (in this case, $1.34/((1.82+1.34)/2)\times100=85$), as a result of which average voltage #1 and average voltage #2 can be held the same. Thus, it is possible to determine whether θ is larger or smaller than the optimum value, as in the other embodiments.

Seventh Embodiment

In the first, second, and sixth embodiments, modulation components at or below the frequency fc are suppressed by the HPF 302 or the RF amplifier 312 having a gain adjustment function, and the frequency components at the dithering frequency fd are suppressed. It is also possible to suppress the modulation components at or below the frequency fc and to suppress the frequency components at the dithering frequency fd by means of a digital circuit having functions similar to those of the HPF 302 or the RF amplifier 312 having a gain adjustment function.

Figure 9:
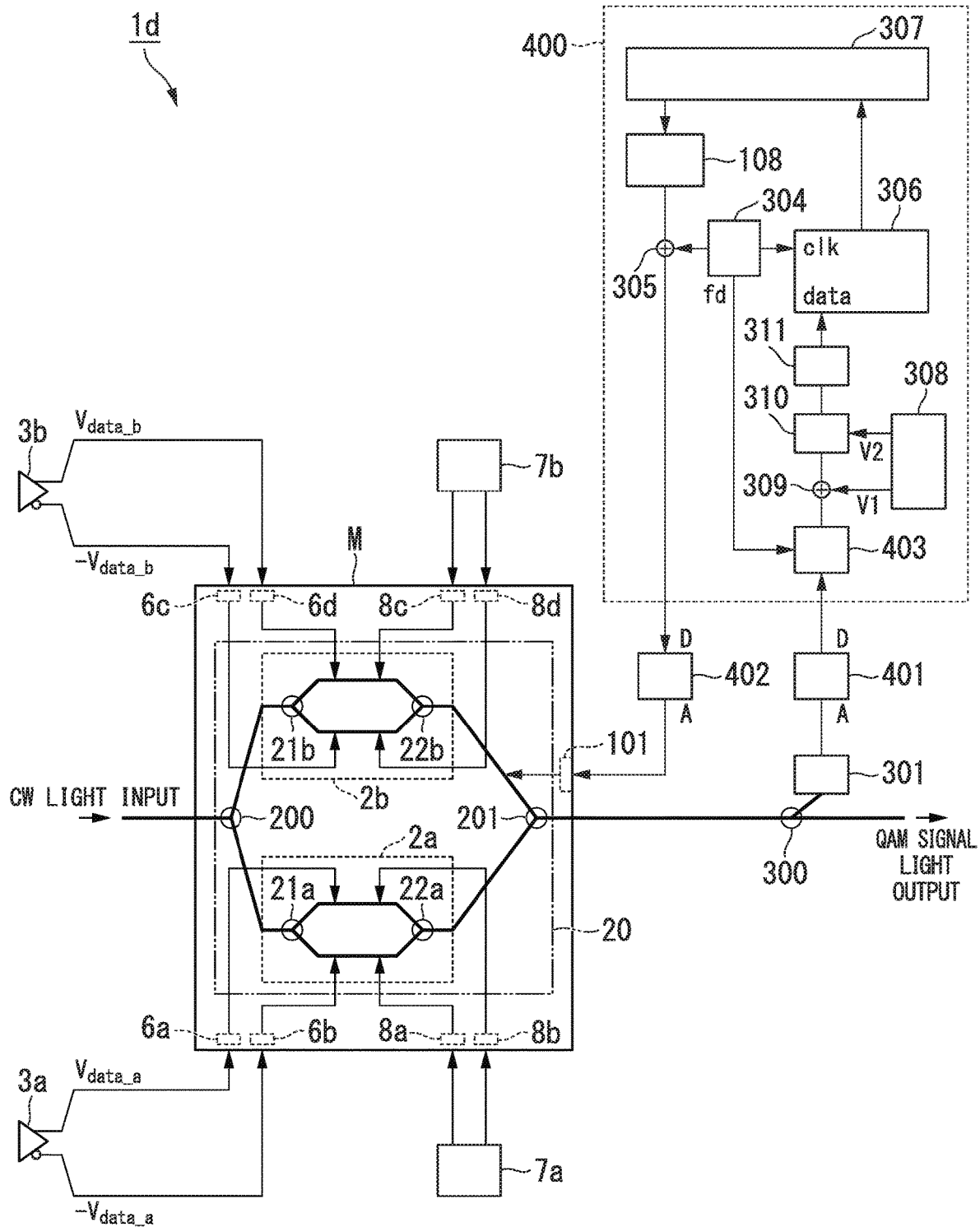
FIG. 9 is a diagram illustrating the structure of a seventh embodiment.

FIG. 9 is a drawing that shows an example of the configuration of an optical transmitter 1d according to the seventh embodiment.

In the optical transmitter 1d shown in the drawing, all of the constituent elements in the ABC circuit aside from the photodetector 301 in the optical transmitter according to one of the above-mentioned embodiments are formed as digital circuits inside a digital signal processor 400. The drawing shows an example of the case in which the digital signal processor 400 includes all of the constituent elements of the ABC circuit 31 aside from the photodetector 301 in the optical transmitter 1a shown in FIG. 3.

The optical transmitter 1d includes an optical modulator M, an in-phase MZI control bias voltage generator 7a and a quadrature MZI control bias voltage generator 7b, and further thereto, includes a photodetector 301, a digital signal processor 400, an analog/digital (AD) converter 401, and a digital/analog (DA) converter 402. The digital signal processor 400 includes an amplitude adjustment circuit 403, a DC power supply 308, a voltage adder 309, a clipper circuit 310, a smoothing circuit 311, a dithering unit 304, a dithering application unit 305, a synchronous detection circuit 306, a controller 307, and a parent MZI control bias voltage generator 108.

The output of the photodetector 301 is input to the digital signal processor 400 via the A/D converter 401. The frequency components of frequency fd included in the output of the AD converter 401 are suppressed by the amplitude adjustment circuit 403. In the present embodiment, the amplitude adjustment circuit 403 is able to obtain, from the dithering unit 304, a clock signal that is synchronized with the dithering signal. In synchronization with the clock signal, the average voltage #1 and average voltage #2 illustrated in FIG. 18 are calculated, and after determining proportional coefficients in the same manner as in the sixth embodiment, the proportional coefficients are multiplied by the output from the AD converter 401. By processing the resulting data sequence in the same manner as in the second embodiment, it is possible to determine whether θ is larger or smaller than the optimum value. Digital data indicating the parent MZI control bias voltage correction amount obtained by the controller 307 is fed back to the parent MZI control bias electrode 101, via the DA converter 402, after adding/subtracting a numerical value corresponding to dithering at the frequency fd, as in the other embodiments.

Eighth Embodiment

In the embodiments explained above, it is not possible to choose the sign (to choose +π/2 or −π/2) of the ABC of the in-phase MZI control bias and the quadrature MZI control bias and θ. In order to achieve these functions, it is possible to combine the first to seventh embodiments explained above with the generally known technique described in Non-Patent Document 1.

In the art described in Non-Patent Document 1, dithering signals having the same frequency fd2 are superimposed on the in-phase MZI control bias and the quadrature MZI control bias, and signals having the frequency fd2 or 2×fd2 superimposed on the output from the photodetector 301 are detected. The dithering unit 304 and a synchronous detection circuit 306a to be mentioned below are operated by time-sharing, so as to cyclically perform the detection of the frequency fd in the first to seventh embodiments and the detection of the frequency fd2 or 2×fd2 according to the technique described in Non-Patent Document 1, thereby allowing any of the above-mentioned embodiments to be combined with the art described in Non-Patent Document 1.

Figure 10:
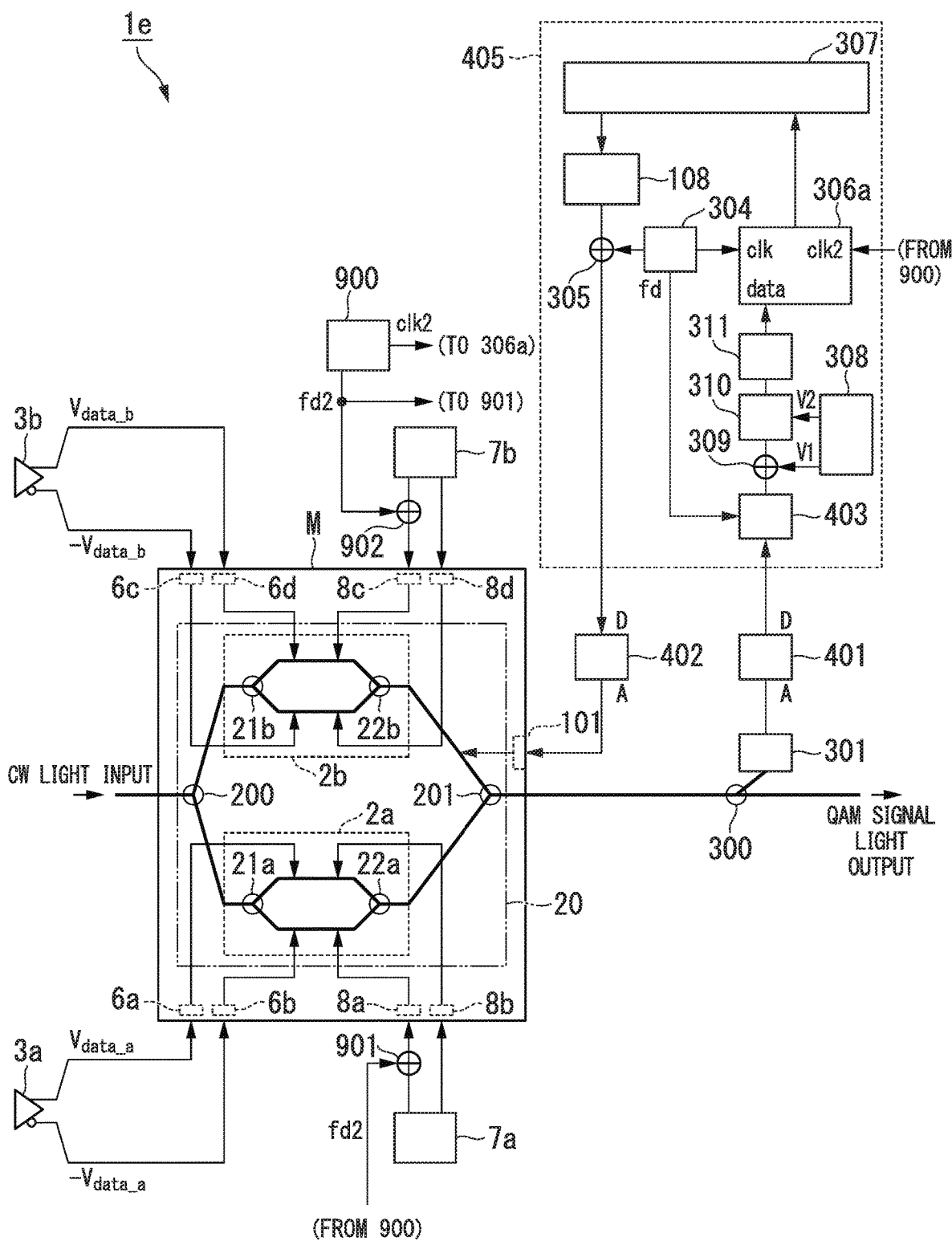
FIG. 10 is a diagram illustrating the structure of an eighth embodiment.

FIG. 10 is a diagram that shows an example of the configuration of an optical transmitter 1e according to the eighth embodiment. It is to be noted that FIG. 10 shows an example of a configuration based on the seventh embodiment. The optical transmitter 1e of the eighth embodiment differs from the optical transmitter 1d of the seventh embodiment in that a digital signal processor 405 is provided instead of the digital signal processor 400, the synchronous detection circuit 306a is provided instead of the synchronous detection circuit 306, and a dithering unit 900, a dithering application unit 901, and a dithering application unit 902 are provided.

The dithering application unit 901 and the dithering application unit 902 respectively apply a dithering signal having the frequency fd2, generated by the dithering unit 900, to the output voltage from the in-phase MZI control bias voltage generator 7a (in the example in FIG. 10, the output voltage supplied to the first in-phase MZI control bias electrode 8a) and to the output voltage from the quadrature MZI control bias voltage generator 7b (in the example in FIG. 10, the output voltage supplied to the first quadrature MZI control bias electrode 8c). Alternatively, it is possible to apply a dithering signal having the frequency fd2 to either the output voltage of the in-phase MZI control bias voltage generator 7a or the output voltage of the quadrature MZI control bias voltage generator 7b. In this case, it is not necessary to provide the dithering application unit 901 or the dithering application unit 902.

In this case, in the time bands during which the dithering unit 900 generates a dithering signal, the dithering unit 304 does not generate a dithering signal. Conversely, when the dithering unit 304 is generating a dithering signal, the dithering unit 900 does not generate a dithering signal. In the time bands during which the dithering unit 900 generates the dithering signal, a second reference clock signal (clk2) having the frequency fd2 or 2×fd2 is input from the dithering unit 900 to the synchronous detection circuit 306a. During these time bands, the reference clock signal (clk) is not input from the dithering unit 304 to the synchronous detection circuit 306a. The synchronous detection circuit 306a synchronously detects the signals having the frequency fd2 or 2×fd2 superimposed on the output from the photodetector 301 and controls the bias in accordance with the technique described in Non-Patent Document 1.

What needs to be noted here is that, in the art described in Non-Patent Document 1, the output from the photodetector 301 already has frequency components of the frequency fd2 or 2×fd2 superimposed thereon, so the HPF 302 or the amplitude adjustment circuit 403 must transmit the signal without suppressing the frequency components at the frequency fd2 or 2×fd2. Therefore, the frequency fd2 is set so that the relation fd<fc<fd2 or fd<fc<2×fd2 is satisfied.

Ninth Embodiment

The embodiments explained above are configured so as to monitor, with the RMS monitor 303 provided outside the modulator, modulated light tapped by the optical tap 300. As an alternative, it is possible to use a power monitor that is housed inside the optical modulator. When using such a configuration, caution is necessary because in some cases, changes in the optical modulator output intensity are not correctly reflected in the output of the power monitor housed in the modulator. For example, suppose that the output intensity of the optical modulator increases or decreases as a result of sweeping one of three bias voltages. While the output of the power monitor housed in the modulator also increases and decreases, the bias voltages at which extreme values occur in the output intensity of the optical modulator will sometimes shift with respect to the bias voltages at which extreme values occur in the output of the power monitor housed in the modulator. Therefore, the controller 307 refers to results obtained by adding a certain fixed offset value, determined by the error in the optical power monitor, to the synchronous detection results, in order to feedback-control the parent MZI control bias voltage. If there is a shift as mentioned above, for example, there can be situations in which, although the parent MZI control bias voltage should be optimized when the synchronous detection result is 0, the parent MZI control bias voltage has the optimum value when the synchronous detection result is a value other than 0. In order to correct this error, a certain fixed offset value that is determined by the error in the optical power monitor is added to the synchronous detection result, and the parent MZI control bias voltage is feedback-controlled so that the addition result is 0 or a value close to 0.

Tenth Embodiment

Figure 11:
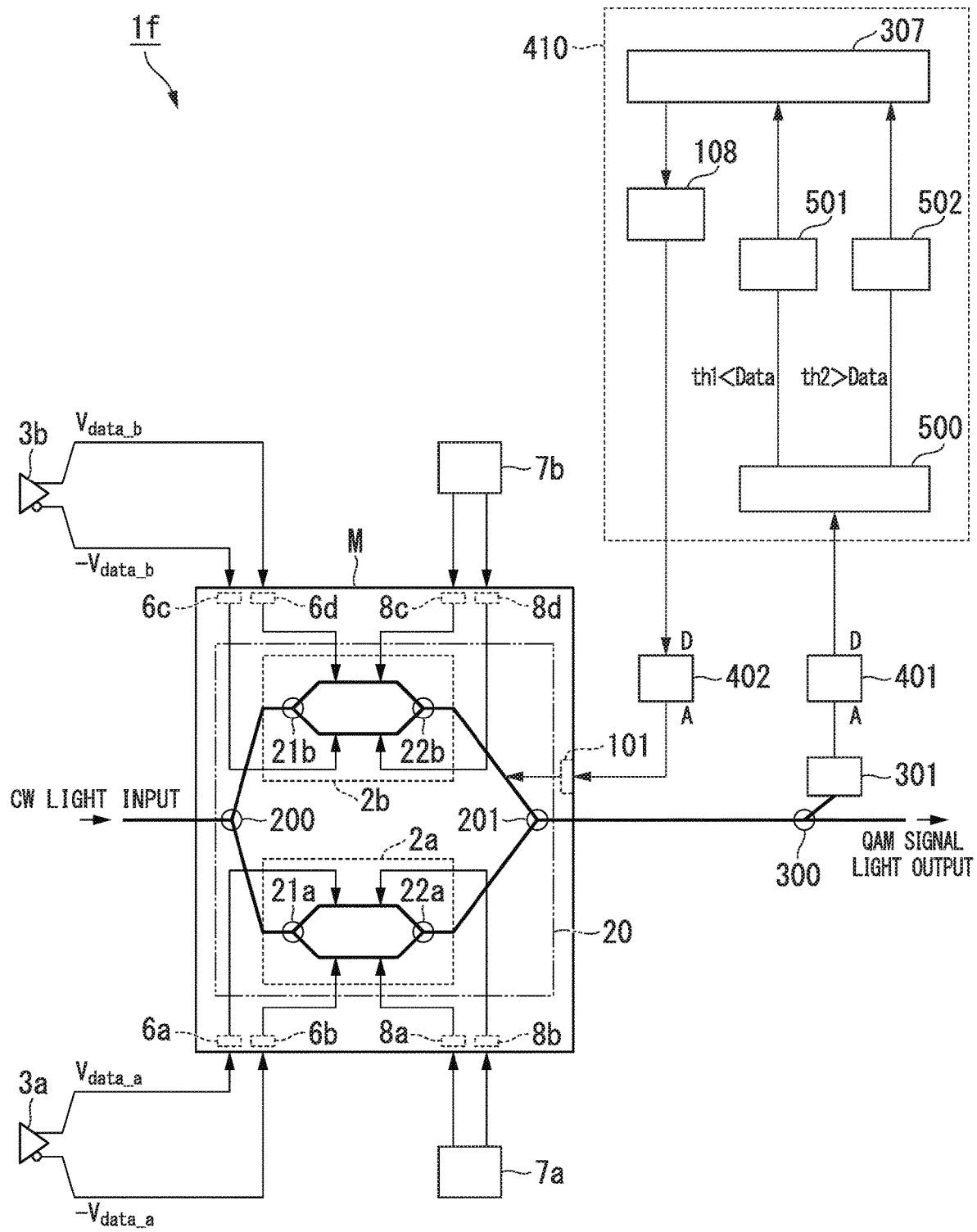
FIG. 11 is a diagram illustrating the structure of a tenth embodiment.

FIG. 11 is a drawing that shows an example of the configuration of an optical transmitter 1$f$ according to the tenth embodiment.

In the optical transmitter 1$f$ shown in the drawing, all of the constituent elements of the ABC circuit aside from the photodetector 301 are formed as digital circuits inside the digital signal processor 410, as in the seventh embodiment.

The optical transmitter 1$f$ includes an optical modulator M, an in-phase MZI control bias voltage generator 7$a$, and a quadrature MZI control bias voltage generator 7$b$, and further thereto, includes a photodetector 301, a digital signal processor 410, an AD converter 401, and a DA converter 402. The digital signal processor 410 includes an identification circuit 500, a first computation circuit 501, a second computation circuit 502, a controller 307, and a parent MZI control bias voltage generator 108.

The optical tap 300 splits the optical signal output from the optical modulator M and outputs the split optical signal to the photodetector 301. The photodetector 301 converts the output light from the optical tap 300 into an electric signal. Due to this conversion, the photodetector 301 generates voltages corresponding to the intensity of the output light. The higher the optical intensity of the optical signal, the higher the voltage value of the signal. The AD converter 401 converts the electrical signal generated by the photodetector 301 from an analog signal to a digital signal. The digitally converted electrical signal represents data including the output voltage values from the photodetector 301. The AD converter 401 outputs the digitally converted signal to the identification circuit 500 of the digital signal processor 410.

The identification circuit 500 has at least one identifying threshold value for identifying the optical intensity of an optical signal converted into voltage values. In the present embodiment, an example of a case in which the identification circuit 500 has two identifying threshold values, i.e., a first threshold value (th1) and a second threshold value (th2), will be explained. The identification circuit 500 analyzes the relationship between the magnitudes of the identifying threshold values and the voltages indicated by a signal input from the AD converter 401. When the voltage indicated by an input signal exceeds the first threshold value (th1), the identification circuit 500 outputs the value of the input signal to the first computation circuit 501. Additionally, when the voltage indicated by the input signal is smaller than the second threshold value (th2), the identification circuit 500 outputs the value of the input signal to the second computation circuit 502.

The setting of the first threshold value and the second threshold value, and the operation of the identification circuit 500, will be explained with reference to FIG. 12A, FIG. 12B, and FIG. 13. In this case, 16QAM will be used for the explanation instead of QPSK.

Figure 12A:
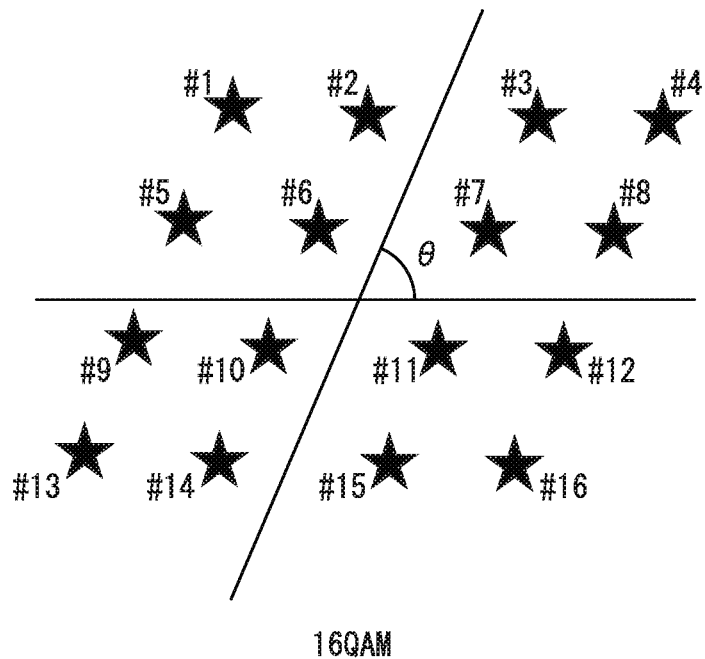
FIG. 12A is a diagram illustrating the relationship between the change in the optical phase difference and the optical intensity of each symbol.
Figure 12B:
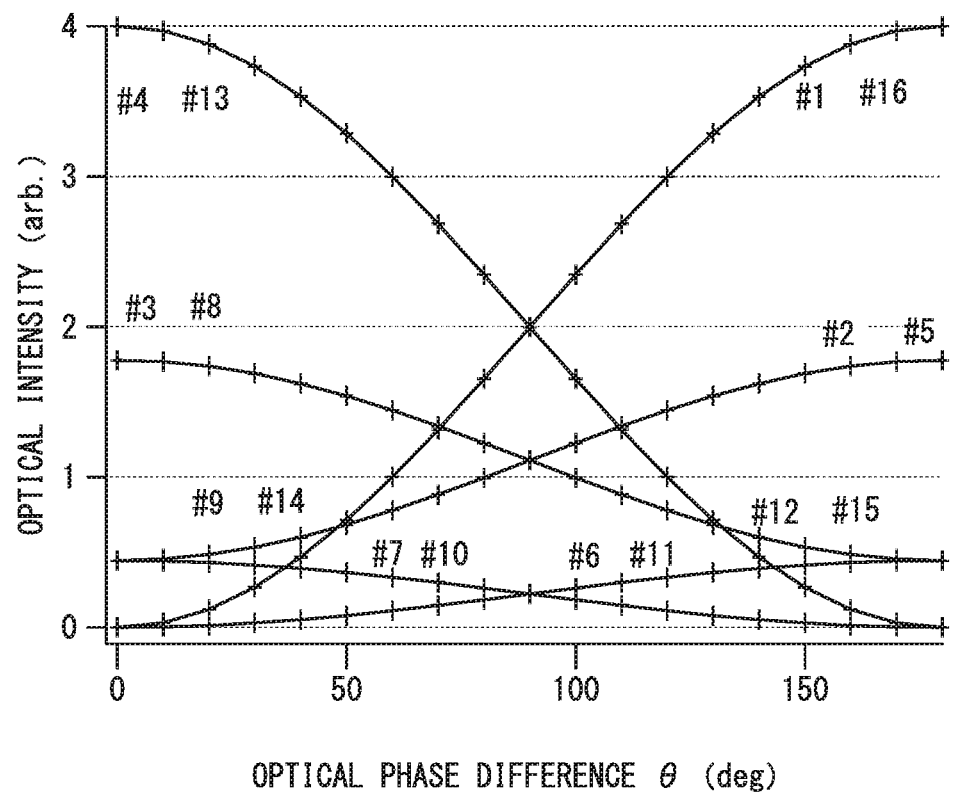
FIG. 12B is a diagram illustrating the relationship between the change in the optical phase difference and the optical intensity of each symbol.

FIG. 12A and FIG. 12B are drawings that show the relationship between the change in the optical phase difference θ and the optical intensities of the symbols. FIG. 12A shows the optical phase difference θ and the symbols in a 16QAM constellation. As indicated by the stars, the 16 QAM constellation includes symbols #1 to #16. Symbols at positions far from the origin have optical electric fields with absolute values that are that much larger, so they have high optical intensity.

FIG. 12B is a graph showing how the optical intensity of the symbols #1 to #16 shown in FIG. 12A change in response to the optical phase difference θ. When θ shifts from a certain value that is not the optimum value and approaches the optimum value π/2=90° (deg), symbols with decreased optical intensity and symbols with increased optical intensity appear, so that the variation in the optical intensity between symbols becomes complicated.

Figure 13:
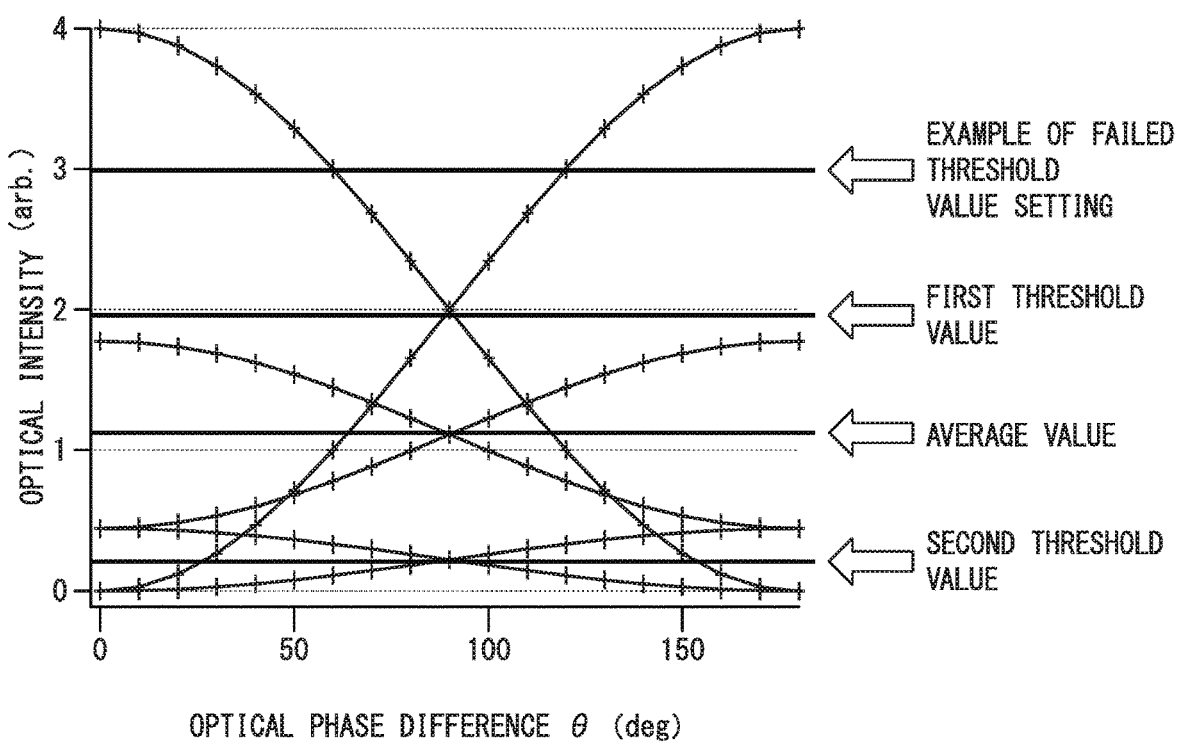
FIG. 13 is a diagram illustrating the relationship between the change in the optical intensity and threshold values as the optical phase difference changes in the tenth embodiment.

FIG. 13 is a drawing that shows the relationship between the threshold values and the change in the optical intensity depending on the change in the optical phase difference θ. As mentioned above, there are variations in the optical intensities of the symbols, but the average value of the optical intensity of all of the symbols in 16QAM remains constant irrespective of θ, as in the example of QPSK explained in FIG. 16. The position of this average value is shown in FIG. 13. For this reason, it is not possible to control θ by monitoring only the optical intensity of the modulated light. Additionally, as in the example of QPSK explained in FIG. 16, it is possible to control θ by determining the RMS of the optical intensity. However, in the case of multi-level QAM, the change in optical intensity between symbols becomes complicated, so the rate of change of the RMS of the optical intensity is suppressed and the precision of control of θ is lowered.

Therefore, as mentioned above, in the present embodiment, the identification circuit 500 has two threshold values. In the example shown in FIG. 13, focusing only on the symbols having an optical intensity that is higher than the first threshold value, it can be seen that the total optical intensity of these symbols (the total optical intensity of the symbols #1, #4, #13, and #16 in FIG. 12A) monotonically decreases as θ approaches the optimum value of 90°. Additionally, focusing only on the symbols having an optical intensity lower than the second threshold value, it can be seen that, although there are somewhat complicated changes when θ is in the range from 0° to 30° and from 150° to 180°, when θ is in the range from 30° to 150°, the total optical intensity (the total optical intensity of the symbols #6, #7, #10, and #11 in FIG. 12A) monotonically increases as θ approaches the optimum value of 90°. By making use of this property, it is possible to precisely control θ.

Specifically, the controller 307 need only control θ so as to minimize the average value of the voltages indicated by the signal (data) input to the first computation circuit 501 and to maximize the average value of the voltages indicated by the signal (data) input to the second computation circuit 502. It is to be noted that it is also possible to use the integrated value of the voltages or the root mean square of the voltage values instead of the average value. Alternatively, the controller 307 may control θ so as to minimize the frequency of appearance of data input to the first computation circuit 501 and the second computation circuit 502.

While the manner in which the first and second threshold values are determined depends on the optical intensity of the modulated light and the band of the photodetector 301, it should preferably be set so that an optical intensity greater than the first threshold value always occurs, and an optical intensity smaller than the second threshold value always occurs, at any θ. FIG. 13 shows an example in which the setting of the first threshold value failed. In this example, when θ is in the range from 60° to 120°, there are no optical intensities larger than the threshold value, so no data is input to the first computation circuit 501, and θ cannot be set to the optimum value of 90°.

This problem can be solved by setting the first threshold value to be sufficiently higher than the average value of the optical intensity and setting the second threshold value to be sufficiently lower than the average value of the optical intensity beforehand, and in the controller 307, changing the first threshold value and the second threshold value as needed. For example, if the frequency of appearance of the data input to the first computation circuit 501 is 0 or very small (if it is smaller than a preset frequency), the controller 307 shifts the first threshold value closer to the average value of the optical intensity, i.e., the time-average value of the voltages output from the photodetector 301. Additionally, for example, if the frequency of appearance of the data input to the second computation circuit 502 is 0 or very small, the controller 307 shifts the second threshold value closer to the average value of the optical intensity, i.e., the time-average value of the voltages output from the photodetector 301. As a result thereof, the frequency of appearance of data input to the first computation circuit 501 and the second computation circuit 502 is ensured to a certain degree.

Once the appearance frequency of the data is ensured, it is then only necessary for the controller 307 to control θ so that, with the first threshold value and the second threshold value in a fixed state, the average value, the integrated value, or the root mean square of the voltages indicated by the signal (data) input to the first computation circuit 501 and the second computation circuit 502 is maximized or minimized. Alternatively, the controller 307 may control θ so as to minimize the frequency of appearance of data input to the first computation circuit 501 and the second computation circuit 502.

Since the data collected by the first computation circuit 501 and the second computation circuit 502 is basically a random signal, the more data there is, the more statistically reliable computation results are obtained. However, in order to collect a lot of data, the digital signal processor 410 must be occupied with the collection of data for a long time. There is a problem in that, during this time, the digital signal processor 410 cannot perform work for other types of control such as, for example, controlling the substrate temperature or monitoring the intensity of the light source. In order to avoid this problem, it is possible to follow a process in which the collection and computation of data in the first computation circuit 501 and the second computation circuit 502 are temporarily interrupted, the digital signal processor 410 performs the other work such as controlling the substrate temperature and monitoring the intensity of the light source during this interruption period, and the collection and computation of data by the first computation circuit 501 and the second computation circuit 502 are resumed thereafter.

Thus, the controller 307 determines whether or not the parent MZI control bias voltage is appropriate on the basis of the results of the computation processes in the first computation circuit 501 and the second computation circuit 502, and feedback-controls the parent MZI control bias voltage generator 108 by using the results of the determination. In the computation process, the time-average value, the integrated value, or the root mean square of the output voltages from the photodetector 301, or the frequency by which the output voltages are chosen in the identification circuit 500, is computed.

Additionally, in the present embodiment, two threshold values are used in the identification circuit 500, but it is possible to use just one. Alternatively, it is possible to use three or more threshold values and computation circuits corresponding to these threshold values, and to compare the computation results with each other. Thus, the identification circuit 500 selects the output voltages of the photodetector 301 in accordance with each of N (where N is a natural number) threshold values, and the computation circuits perform computation processes on the data for each of the N types of output voltage selected by the identification circuit 500. It is to be noted that if the identification circuit 500 has M (where M is an integer equal to or greater than 2) threshold values, then at least one of the threshold values is set so as to be larger than the time-average value of the output voltages from the photodetector 301 and at least one of the other threshold values is set so as to be smaller than the time-average value of the output voltages from the photodetector 301.

Eleventh Embodiment

In the aforementioned tenth embodiment, the identification circuit 500 had two threshold values, only the data higher than the first threshold value is counted in the first computation circuit 501 and only the data lower than the second threshold value is counted in the second computation circuit 502. However, the present invention is not limited to such a configuration, and the present invention may be configured so as to select only data between the two threshold values, to count the selected data in a single computation circuit, and to calculate the average value or integrated value of the voltages, or to calculate the root mean square of the voltage values.

Figure 14:
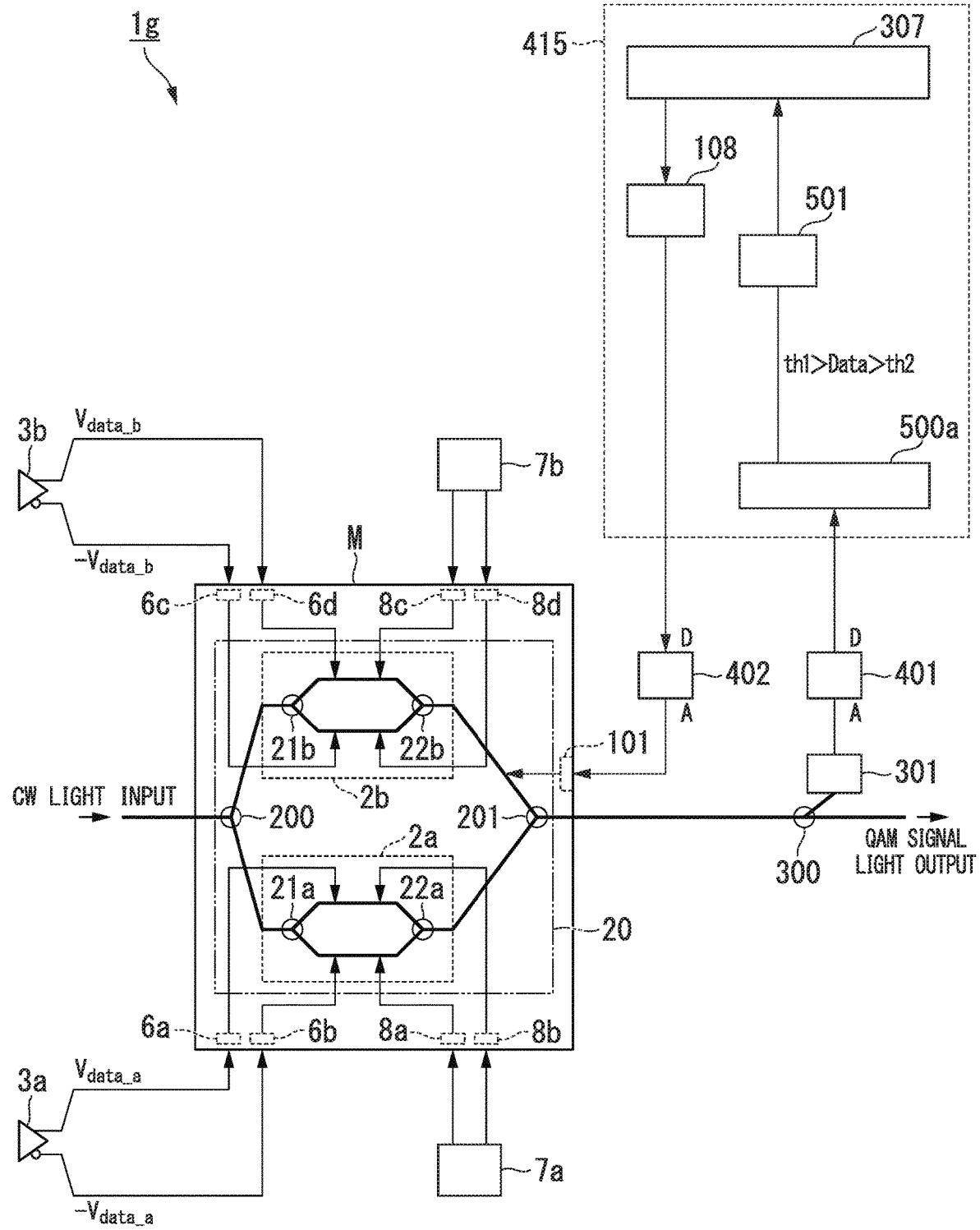
FIG. 14 is a diagram illustrating the structure of an eleventh embodiment.

FIG. 14 is a drawing that shows an example of the configuration of an optical transmitter 1g according to the eleventh embodiment.

The optical transmitter 1e according to the eleventh embodiment differs from the optical transmitter 1f according to the tenth embodiment shown in FIG. 11 in that a digital signal processor 415 is provided instead of the digital signal processor 410, an identification circuit 500*a* is provided instead of the identification circuit 500, and a second computation circuit 502 is not used. In the optical transmitter 1*g* shown in FIG. 14, all of the constituent elements in the ABC circuit aside from the photodetector 301 are formed as digital circuits inside the digital signal processor 415, as in the tenth embodiment.

The identification circuit 500*a* has two identifying threshold values, i.e., a first threshold value (th1) and a second threshold value (th2), for identifying the optical intensity of the optical signal converted into voltage values. The identification circuit 500*a* analyzes the relationship between the magnitudes of the identifying threshold values and the voltages indicated by a signal input from the AD converter 401. The identification circuit 500*a* outputs the value of the input signal to the first computation circuit 501 only when the voltage indicated by the input signal is smaller than the first threshold value (th1) and larger than the second threshold value (th2). In other words, the identification circuit 500*a* chooses the signals input from the AD converter 401 so that the upper limit and the lower limit are defined respectively by the first threshold value (th1) and the second threshold value (th2).

The controller 307 only needs to control θ so as to minimize the average value of the voltages indicated by the signal (data) input to the first computation circuit 501. It is to be noted that the integrated value of the voltages or the root mean square of the voltage values could be used instead of the average value. Alternatively, the controller 307 may control θ so as to minimize the frequency of appearance of data input to the first computation circuit 501.

Since the optical intensity shown in FIG. 13 is a value that is calculated under ideal conditions, it is perfectly left-right symmetric about a center at θ=90°. However, in actual modulated signals, the optical intensity shown in FIG. 13 could have a peak that is left-right asymmetric due to deviations in the sign or imperfections in the modulator. Additionally, circuit noise could cause noise that is unrelated to θ, such as surge-type noise or low-power noise due to dark current in the photodetector 301, to be superimposed on the modulated signal.

In the present embodiment, such uneven peaks and surge-type noise is cut off by the first threshold value, and low-power noise due to dark current is cut off by the second threshold value. As a result thereof, it is possible to suppress control error.

According to the embodiments explained above, the optical transmitter using nested MZIs includes an optical modulator, an automatic bias control circuit, and peripheral circuits thereof. The optical modulator includes a parent MZI, an optical input terminal, an in-phase drive signal input electrode, a quadrature drive signal input electrode, an in-phase MZI control bias electrode, a quadrature MZI control bias electrode, an optical output terminal, and a parent MZI control bias electrode. The parent MZI includes an in-phase MZI and a quadrature MZI. The optical input terminal splits continuous-wave light and inputs the split continuous-wave light to the in-phase MZI and the quadrature MZI. The in-phase drive signal input electrode is supplied with a drive signal for implementing optical modulation by changing the optical phase difference between two branches of light obtained by splitting the continuous-wave light in the in-phase MZI. The in-phase MZI control bias electrode is supplied with an in-phase MZI control bias voltage for adjusting the optical phase difference between the two branches of the light optically modulated by the drive signal applied to the in-phase drive signal input electrode. The quadrature drive signal input electrode is supplied with a drive signal for implementing optical modulation by changing the optical phase difference between two branches of light obtained by splitting the continuous-wave light in the quadrature MZI. The quadrature MZI control bias electrode is supplied with a quadrature MZI control bias voltage for adjusting the optical phase difference between the two branches of the light optically modulated by the drive signal applied to the quadrature drive signal input electrode. The optical output terminal multiplexes light output from the in-phase MZI with light output from the quadrature MZI and outputs the multiplexed light. The parent MZI control bias electrode is supplied with a parent MZI control bias voltage for adjusting the optical phase difference between the light output from the in-phase MZI and the light output from the quadrature MZI.

The in-phase MZI includes a first splitting unit that splits the continuous-wave light input from the optical input terminal into the two branches; and a first multiplexing unit that multiplexes the light from the two branches optically modulated by the drive signal applied to the in-phase drive signal input electrode and of which the optical phase difference has been adjusted by the in-phase MZI control bias voltage applied to the in-phase MZI control bias electrode, and outputs the multiplexed light. The quadrature MZI includes a second splitting unit that splits the continuous-wave light input from the optical input terminal into the two branches; and a second multiplexing unit that multiplexes the light from the two branches optically modulated by the drive signal applied to the quadrature drive signal input electrode and of which the optical phase difference has been adjusted by the quadrature MZI control bias voltage applied to the quadrature MZI control bias electrode, and outputs the multiplexed light.

The automatic bias control circuit includes a parent MZI control bias voltage generator, a photodetector, a low-frequency cut-off circuit, and a control unit.

The parent MZI control bias voltage generator generates a parent MZI control bias voltage that is applied to the parent MZI control bias electrode. The photodetector converts tapped output light from the optical modulator into an electrical signal. The low-frequency cut-off circuit suppresses modulation components that are slower than a frequency fc, included in the electrical signal converted by the photodetector. The control unit controls the parent MZI control bias voltage generator on the basis of the signal in which the slower modulation components have been suppressed. Specifically, the control unit controls the parent MZI control bias voltage generator so as to minimize the RMS or the peak values of the signal in which the slower modulation components have been suppressed.

Alternatively, the automatic bias control circuit includes a parent MZI control bias voltage generator, a photodetector, a low-frequency cut-off circuit, a clipper circuit, and a control unit.

The parent MZI control bias voltage generator generates a parent MZI control bias voltage that is applied to the parent MZI control bias electrode. The photodetector converts tapped output light from the optical modulator into an electrical signal. The low-frequency cut-off circuit suppresses modulation components that are slower than a frequency fc, included in the electrical signal converted by the photodetector. The clipper circuit clips, at a predetermined threshold value, the electrical signal in which slower modulation components have been suppressed. The control unit feedback-controls the parent MZI control bias voltage generator on the basis of the electrical signal clipped by the clipper circuit. Specifically, the control unit controls the parent MZI control bias voltage generator so as to minimize the average value, the RMS, or the peak value of the voltages of the clipped electrical signals.

Alternatively, the automatic bias control circuit includes a parent MZI control bias voltage generator, a photodetector, a clipper circuit, and a control unit.

The parent MZI control bias voltage generator generates a parent MZI control bias voltage that is applied to the parent MZI control bias electrode. The photodetector converts tapped output light from the optical modulator into an electrical signal. The clipper circuit clips the converted electrical signal at a predetermined threshold value. The control unit feedback-controls the parent MZI control bias voltage generator on the basis of the electrical signal clipped by the clipper circuit. Specifically, the control unit controls the parent MZI control bias voltage generator so that the average value, the RMS, or the peak value of the voltages of the clipped electrical signals becomes a small value.

Alternatively, the automatic bias control circuit includes a parent MZI control bias voltage generator, a photodetector, an identification circuit, a computation circuit, and a control unit.

The parent MZI control bias voltage generator generates the parent MZI control bias voltage applied to the parent MZI control bias electrode. The photodetector generates voltages corresponding to the intensity of the tapped output light from the optical modulator. The identification circuit compares the values of the voltages generated by the photodetector with a predetermined threshold value and chooses the voltages that are greater than the threshold value or the voltages that are less than the threshold value. The computation circuit performs a computation process using the voltages chosen by the identification circuit. The control unit feedback-controls the parent MZI control bias voltage generator on the basis of the results of the computation process.

According to the above-mentioned embodiments, in an optical modulator for generating an optical QAM signal in which multiple MZIs are combined in nested fashion, it becomes possible to hold the parent MZI control bias voltage at the optimum value more precisely and accurately than in the conventional art.

While embodiments of the present invention have been explained in detail above with reference to the drawings, the specific structure need not be limited to these embodiments, and designs and the like that are within a range not departing from the gist of the present invention are included.

INDUSTRIAL APPLICABILITY

The present invention is applicable, for example, to optical transmitters for generating optical quadrature amplitude modulation signals.

DESCRIPTION OF REFERENCE SIGNS

M . . . Optical modulator
1, 1a, 1b, 1c, 1d, 1e, 1f, 1g . . . Optical transmitter
2a . . . In-phase MZI
2b . . . Quadrature MZI
3a . . . In-phase drive amplifier
3b . . . Quadrature drive amplifier
6a . . . First in-phase drive signal input electrode
6b . . . Second in-phase drive signal input electrode
6c . . . First quadrature drive signal input electrode
6d . . . Second quadrature drive signal input electrode
7a . . . In-phase MZI control bias voltage generator
7b . . . Quadrature MZI control bias voltage generator
8a . . . First in-phase MZI control bias electrode
8b . . . Second in-phase MZI control bias electrode
8c . . . First quadrature MZI control bias electrode
8d . . . Second quadrature MZI control bias electrode
20 . . . Parent MZI
21a, 21b . . . Splitting unit
22a, 22b . . . Multiplexing unit
30, 31, 32, 33 . . . automatic bias control circuit (ABC circuit)
101 . . . Parent MZI control bias electrode
108 . . . Parent MZI control bias voltage generator
200 . . . Optical splitting unit
201 . . . Optical multiplexing unit
300 . . . Optical tap
301 . . . Photodetector
302 . . . High-pass filter (HPF)
303 . . . RMS monitor
304, 304b, 900 . . . Dithering unit
305, 305b, 901, 902 . . . Dithering application unit
306, 306a . . . Synchronous detection circuit
307 . . . Controller
308 . . . DC power supply
309 . . . Voltage adder
310 . . . Clipper circuit
311 . . . Smoothing circuit
312 . . . RF amplifier
400, 405, 410, 415 . . . Digital signal processor
401 . . . AD converter
402 . . . DA converter
403 . . . Amplitude adjustment circuit
500, 500a . . . Identification circuit
501 . . . First computation circuit
502 . . . Second computation circuit

The invention claimed is:

1. An optical transmitter comprising: an optical modulator; and an automatic bias control circuit,
   wherein the optical modulator comprises:
   a parent MZI which is a Mach-Zehnder interferometer comprising an in-phase MZI which is a Mach-Zehnder interferometer for in-phase component and a quadrature MZI which is a Mach-Zehnder interferometer for quadrature component;
   an optical input terminal that splits continuous-wave light and inputs the split continuous-wave light to the in-phase MZI and the quadrature MZI;
   an in-phase drive signal input electrode to which is applied a drive signal for implementing optical modulation by changing an optical phase difference between two branches of light obtained by splitting the continuous-wave light in the in-phase MZI;
   a quadrature drive signal input electrode to which is applied a drive signal for implementing optical modulation by changing an optical phase difference between two branches of light obtained by splitting the continuous-wave light in the quadrature MZI;
   an optical output terminal that multiplexes light output from the in-phase MZI and light output from the quadrature MZI and outputs the multiplexed light; and
   a parent MZI control bias electrode to which is applied a parent MZI control bias voltage for adjusting an optical phase difference between the light output from the in-phase MZI and the light output from the quadrature MZI, the in-phase MZI comprises:
a first splitting unit that splits the continuous-wave light input from the optical input terminal into the two branches; and
a first multiplexing unit that multiplexes the light of the two branches optically modulated by the drive signal applied to the in-phase drive signal input electrode, and outputs the multiplexed light,
the quadrature MZI comprises:
a second splitting unit that splits the continuous-wave light input from the optical input terminal into the two branches; and
a second multiplexing unit that multiplexes the light of the two branches optically modulated by the drive signal applied to the quadrature drive signal input electrode, and outputs the multiplexed light,
the automatic bias control circuit comprises:
a parent MZI control bias voltage generator that generates the parent MZI control bias voltage applied to the parent MZI control bias electrode;
a photodetector that converts tapped output light from the optical modulator into an electrical signal;
a clipper circuit that clips the electrical signal at a predetermined threshold value; and
a control unit that feedback-controls the parent MZI control bias voltage generator on the basis of the electrical signal clipped by the clipper circuit,
the control unit controls the parent MZI control bias voltage generator so as to minimize an average value, an effective value, or a peak value of a voltage of the clipped electrical signal, and
the automatic bias control circuit further comprises a low-frequency cut-off circuit that suppresses modulation components that are slower than a first frequency, included in the electrical signal converted by the photodetector, and outputs, to the clipper circuit, the electrical signal in which the slower modulation components have been suppressed.

2. The optical transmitter according to claim 1, wherein the low-frequency cut-off circuit is formed from an amplifier comprising a gain adjustment circuit of which a response speed is equal to or less than the first frequency.

3. The optical transmitter according to claim 1, wherein the low-frequency cut-off circuit cuts off at least some of random noise generated in peripheral circuits in the optical transmitter or random noise in the continuous-wave light input to the optical input terminal.

4. The optical transmitter according to claim 1, wherein the automatic control circuit comprises:
a first dithering application unit that applies dithering, at a second frequency lower than the first frequency, to the parent MZI control bias voltage; and
a synchronous detection unit that performs, at the second frequency, synchronous detection on the electrical signal in which the slower modulation components have been suppressed by the low-frequency cut-off circuit, and
the control unit implements processing for controlling the parent MZI control bias voltage generator so that a result of the synchronous detection is 0.

5. The optical transmitter according to claim 4, wherein the control unit controls the parent MZI control bias voltage generator so that a result obtained by adding a predetermined offset value to the result of the synchronous detection is 0, and the offset value is determined by error in an optical power monitor for measuring intensity of the tapped output light from the optical modulator.

6. The optical transmitter according to claim 4, wherein an amplitude of the dithering during a startup sequence of the optical transmitter is made larger than the amplitude of the dithering during an operating period.

7. The optical transmitter according to claim 1, wherein the automatic bias control circuit comprises:
a second dithering application unit that applies dithering, at a third frequency, to the threshold value of the clipping by the clipper circuit; and
a synchronous detection unit that performs, at the third frequency, synchronous detection on an output from the clipper circuit, and
the control unit implements processing for controlling the parent MZI control bias voltage generator by referring to the result of the synchronous detection.

8. The optical transmitter according to claim 7, wherein the control unit controls the parent MZI control bias voltage generator by referring to a result obtained by adding a predetermined offset value to the result of the synchronous detection, and
the offset value is determined by error in an optical power monitor for measuring intensity of the tapped output light from the optical modulator.

9. The optical transmitter according to claim 1, wherein the optical modulator further comprises:
an in-phase MZI control bias electrode to which is applied an in-phase MZI control bias voltage for adjusting the optical phase difference between the light of the two branches optically modulated by the drive signal applied to the in-phase drive signal input electrode; and
a quadrature MZI control bias electrode to which is applied a quadrature MZI control bias voltage for adjusting the optical phase difference between the light of the two branches optically modulated by the drive signal applied to the quadrature drive signal input electrode,
the first multiplexing unit multiplexes the light from the two branches optically modulated by the drive signal applied to the in-phase drive signal input electrode and of which the optical phase difference has been adjusted by the in-phase MZI control bias voltage applied to the in-phase MZI control bias electrode, and outputs the multiplexed light,
the second multiplexing unit multiplexes the light from the two branches optically modulated by the drive signal applied to the quadrature drive signal input electrode and of which the optical phase difference has been adjusted by the quadrature MZI control bias voltage applied to the quadrature MZI control bias electrode, and outputs the multiplexed light,
the automatic bias control circuit comprises a third dithering application unit that applies dithering, at a fourth frequency, to at least one of the in-phase MZI control bias voltage applied to the in-phase MZI control bias electrode and the quadrature MZI control bias voltage applied to the quadrature MZI control bias electrode, and
the fourth frequency or a frequency that is twice the fourth frequency is higher than the first frequency.

10. The optical transmitter according to claim 1, wherein the clipper circuit implements the clipping by raising a signal that does not reach the threshold value up to the threshold value.

11. The optical transmitter according to claim 1, wherein the optical modulator further comprises:
an in-phase MZI control bias electrode to which is applied an in-phase MZI control bias voltage for adjusting the optical phase difference between the light of the two branches optically modulated by the drive signal applied to the in-phase drive signal input electrode; and
a quadrature MZI control bias electrode to which is applied a quadrature MZI control bias voltage for adjusting the optical phase difference between the light of the two branches optically modulated by the drive signal applied to the quadrature drive signal input electrode,
the first multiplexing unit multiplexes the light from the two branches optically modulated by the drive signal applied to the in-phase drive signal input electrode and of which the optical phase difference has been adjusted by the in-phase MZI control bias voltage applied to the in-phase MZI control bias electrode, and outputs the multiplexed light,
the second multiplexing unit multiplexes the light from the two branches optically modulated by the drive signal applied to the quadrature drive signal input electrode and of which the optical phase difference has been adjusted by the quadrature MZI control bias voltage applied to the quadrature MZI control bias electrode, and outputs the multiplexed light, and
the control unit adjusts one or both of the in-phase MZI control bias voltage applied to the in-phase MZI control bias electrode and the quadrature MZI control bias voltage applied to the quadrature MZI control bias electrode before starting to control the parent MZI control bias voltage.

12. An optical transmitter comprising: an optical modulator; and an automatic bias control circuit,
wherein the optical modulator comprises:
a parent MZI which is a Mach-Zehnder interferometer comprising an in-phase MZI which is a Mach-Zehnder interferometer for in-phase component and a quadrature MZI which is a Mach-Zehnder interferometer for quadrature component;
an optical input terminal that splits continuous-wave light and inputs the split continuous-wave light to the in-phase MZI and the quadrature MZI;
an in-phase drive signal input electrode to which is applied a drive signal for implementing optical modulation by changing an optical phase difference between two branches of light obtained by splitting the continuous-wave light in the in-phase MZI;
a quadrature drive signal input electrode to which is applied a drive signal for implementing optical modulation by changing an optical phase difference between two branches of light obtained by splitting the continuous-wave light in the quadrature MZI;
an optical output terminal that multiplexes light output from the in-phase MZI and light output from the quadrature MZI and outputs the multiplexed light; and
a parent MZI control bias electrode to which is applied a parent MZI control bias voltage for adjusting an optical phase difference between the light output from the in-phase MZI and the light output from the quadrature MZI,
the in-phase MZI comprises:
a first splitting unit that splits the continuous-wave light input from the optical input terminal into the two branches; and
a first multiplexing unit that multiplexes the light of the two branches optically modulated by the drive signal applied to the in-phase drive signal input electrode, and outputs the multiplexed light,
the quadrature MZI comprises:
a second splitting unit that splits the continuous-wave light input from the optical input terminal into the two branches; and
a second multiplexing unit that multiplexes the light of the two branches optically modulated by the drive signal applied to the quadrature drive signal input electrode, and outputs the multiplexed light,
the automatic bias control circuit comprises:
a parent MZI control bias voltage generator that generates the parent MZI control bias voltage applied to the parent MZI control bias electrode;
a photodetector that generates voltages corresponding to the intensity of tapped output light from the optical modulator;
an identification circuit that compares the values of the voltages generated by the photodetector with a predetermined threshold value and chooses the voltages that are greater than the threshold value or the voltages that are less than the threshold value;
a computation circuit that performs a computation process using data regarding the voltages chosen by the identification circuit; and
a control unit that feedback-controls the parent MZI control bias voltage generator on the basis of a result of the computation process.

13. The optical transmitter according to claim 12, wherein the computation circuit computes, during the computation process, a time-average value of the voltages that are chosen, an integrated value of the voltages that are chosen, or a root mean square of the voltages that are chosen.

14. The optical transmitter according to claim 12, wherein the computation circuit computes, during the computation process, a frequency by which the voltages are chosen by the identification circuit.

15. The optical transmitter according to claim 12, wherein the identification circuit chooses N types of voltage output from the photodetector on the basis of N (where N is a natural number) threshold values, and
the computation circuit performs the computation process on data for each of the N types of voltage chosen by the identification circuit.

16. The optical transmitter according to claim 15, wherein the control unit, when the frequency by which the voltages are chosen by the identification circuit is less than a predetermined frequency, shifts each of the N threshold values closer to a time-average value of the voltages generated by the photodetector.

17. The optical transmitter according to claim 12, wherein the identification circuit chooses the voltages output from the photodetector so that an upper limit and a lower limit are defined by two threshold values, and
the computation circuit performs the computation process on data regarding the voltages chosen by the identification circuit.

18. The optical transmitter according to claim 17, wherein the control unit, when the frequency by which the voltages are chosen by the identification circuit is less than a predetermined frequency, shifts each of the two threshold values closer to a time-average value of the voltages generated by the photodetector.

* * * * *